(12) United States Patent
Ueno et al.

(10) Patent No.: US 7,792,414 B2
(45) Date of Patent: *Sep. 7, 2010

(54) SIGNAL COMPRESSING APPARATUS

(75) Inventors: Shoji Ueno, Fujisawa (JP); Norihiko Fuchigami, Yamato (JP); Yoshiaki Tanaka, Fujisawa (JP)

(73) Assignee: Victor Company of Japan, Limited, Yokohama (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/927,070

(22) Filed: Oct. 29, 2007

(65) Prior Publication Data

US 2008/0174896 A1  Jul. 24, 2008

Related U.S. Application Data

(60) Continuation of application No. 10/795,297, filed on Mar. 9, 2004, now Pat. No. 7,394,973, which is a division of application No. 09/985,048, filed on Nov. 1, 2001, now Pat. No. 6,741,801, which is a division of application No. 09/655,046, filed on Sep. 5, 2000, now Pat. No. 6,393,203, which is a division of application No. 08/887,216, filed on Jul. 2, 1997, now Pat. No. 6,151,442.

(30) Foreign Application Priority Data

Jul. 8, 1996  (JP) .................................. 8-197000

(51) Int. Cl.
*H04N 5/91* (2006.01)
(52) U.S. Cl. ........................................ 386/68
(58) Field of Classification Search ............... 386/95, 386/68, 125–126, 46, 45, 131, 99, 98
See application file for complete search history.

(56) References Cited

U.S. PATENT DOCUMENTS

| 5,402,406 A | * | 3/1995 | Fuma et al. .................... 369/84 |
| 5,574,787 A | | 11/1996 | Ryan |
| 5,627,657 A | * | 5/1997 | Park ............................. 386/70 |
| 5,675,693 A | | 10/1997 | Kagoshima |
| 5,687,157 A | | 11/1997 | Imai et al. |
| 5,748,594 A | | 5/1998 | Nishio et al. |
| 5,864,800 A | | 1/1999 | Imai et al. |
| 5,926,448 A | | 7/1999 | Yokota et al. |

(Continued)

FOREIGN PATENT DOCUMENTS

JP  8223052  8/1996

(Continued)

*Primary Examiner*—Thai Tran
*Assistant Examiner*—Tat Chio
(74) *Attorney, Agent, or Firm*—Connolly Bove Lodge & Hutz LLP

(57) ABSTRACT

An input signal is quantized into a quantization-resultant signal. The quantization-resultant signal is compressed into a compression-resultant signal. The compression-resultant signal is formatted into a formatting-resultant signal corresponding to a predetermined format for a digital recording disc. The formatting-resultant signal includes segments corresponding to user data areas prescribed in the predetermined format. The compression-resultant signal is placed in the segments of the formatting-resultant signal. The formatting-resultant signal is encoded into an encoding-resultant signal of a CD format. The encoding-resultant signal is recorded on a recording medium.

4 Claims, 24 Drawing Sheets

U.S. PATENT DOCUMENTS

| | | |
|---|---|---|
| 6,151,442 A | 11/2000 | Ueno et al. |
| 6,393,203 B1 | 5/2002 | Ueno et al. |
| 6,741,801 B2 * | 5/2004 | Ueno et al. .................. 386/98 |
| 7,394,973 B2 * | 7/2008 | Ueno et al. .................. 386/98 |
| 2008/0177553 A1 * | 7/2008 | Ueno et al. .................. 704/500 |
| 2008/0215341 A1 * | 9/2008 | Ueno et al. .................. 704/500 |

FOREIGN PATENT DOCUMENTS

| | | |
|---|---|---|
| JP | 9016199 | 1/1997 |

* cited by examiner

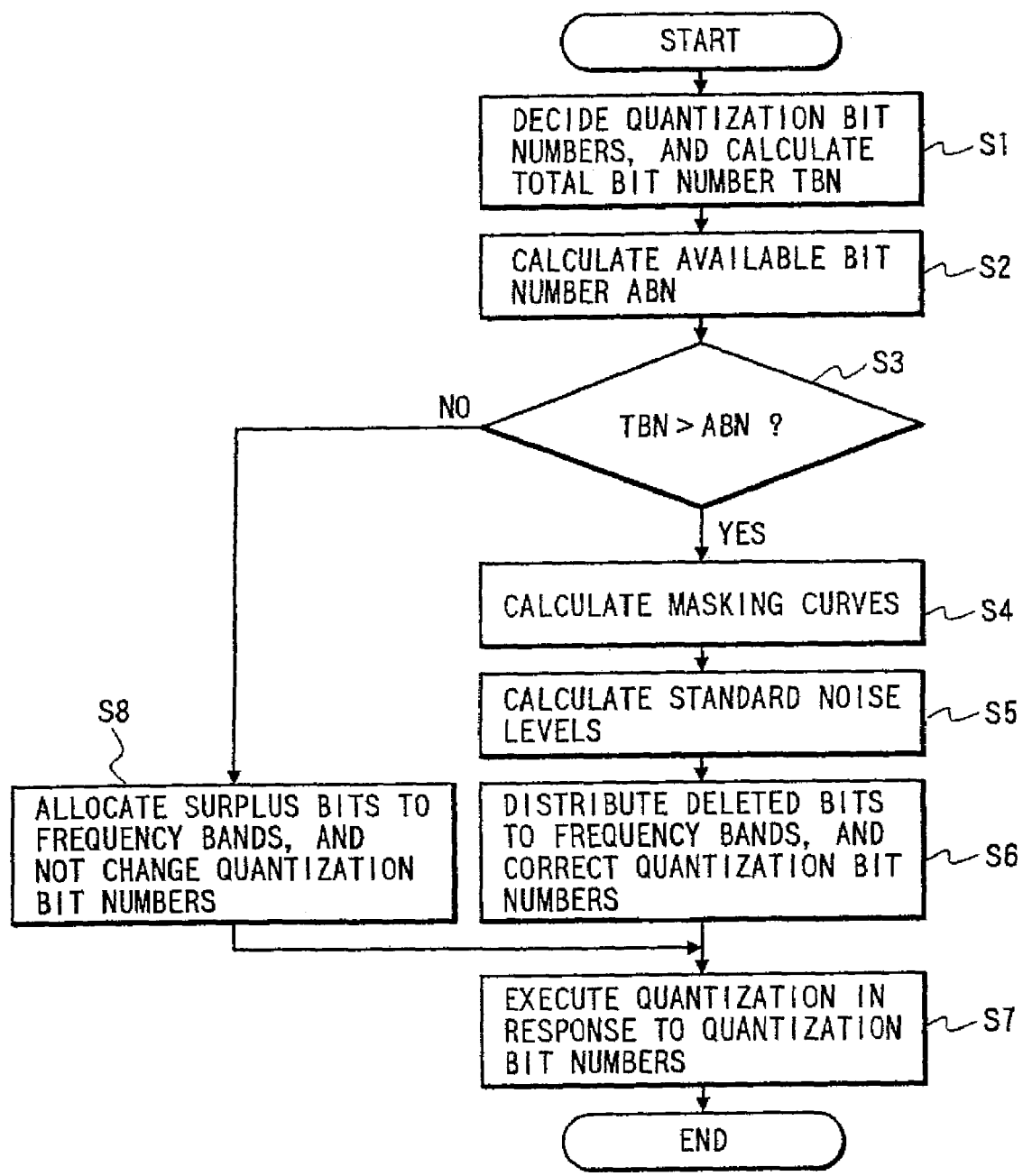

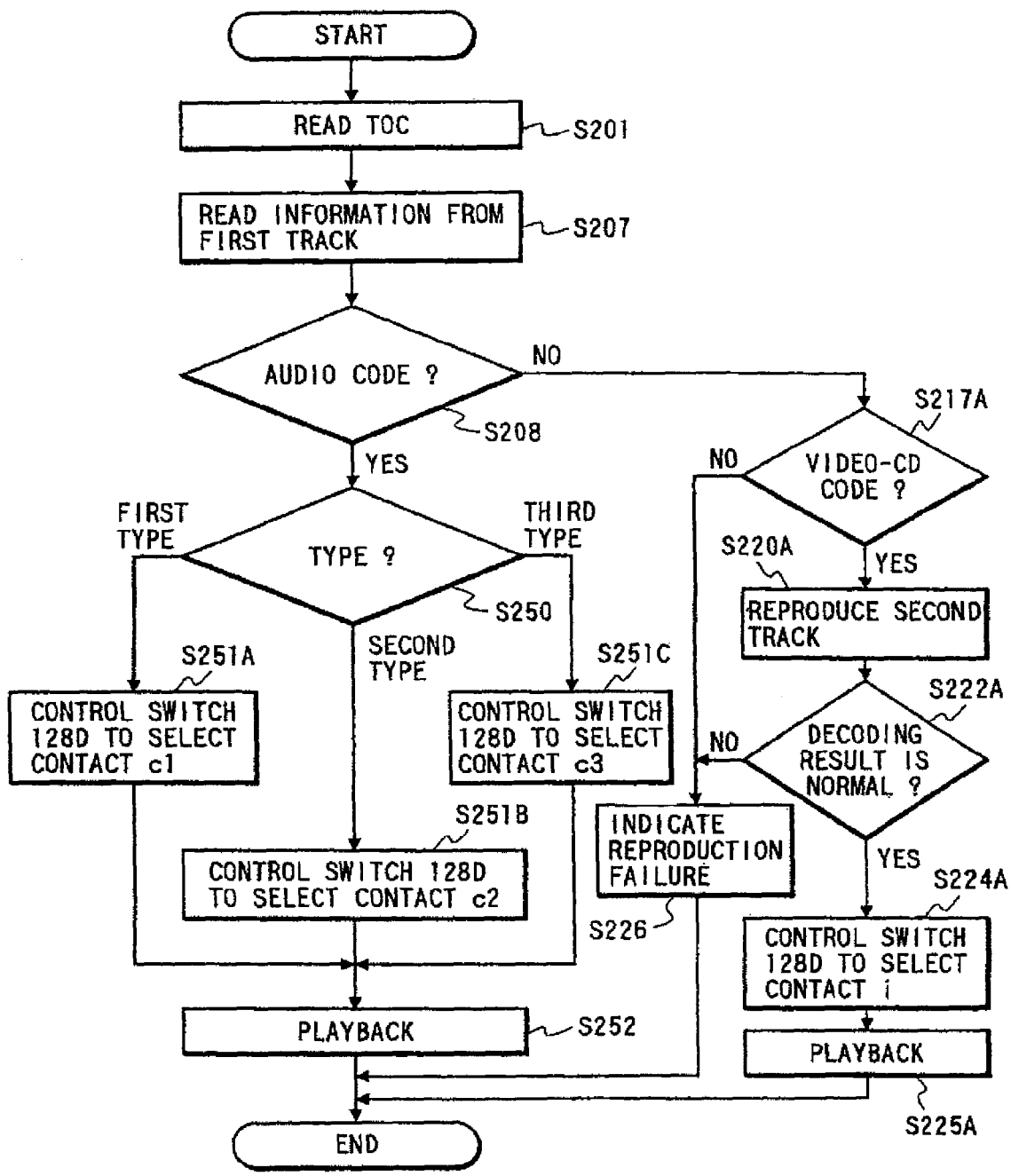

SIGNAL COMPRESSING APPARATUS

CROSS REFERENCE TO RELATED APPLICATION

This application is a Continuation of U.S. application Ser. No. 10/795,297, filed Mar. 9, 2004; which is a Divisional of U.S. application Ser. No. 09/985,048, filed Nov. 1, 2001, which is a Divisional of U.S. application Ser. No. 09/655,046, filed Sep. 5, 2000, now U.S. Pat. No. 6,393,203, issued May 21, 2002, which is a Division of U.S. application Ser. No. 08/887,216, filed Jul. 2, 1997, now U.S. Pat. No. 6,151,442, issued Nov. 21, 2000, and for which priority is claimed under 35 U.S.C. §120; and this application claims priority to Application No. 8-197000 filed in Japan on Jul. 8, 1996, under 35 U.S.C. §119; the entire contents of all are hereby incorporated by reference.

BACKGROUND OF THE INVENTION

1. Field of the Invention

This invention relates to a signal compressing apparatus such as an audio signal compressing apparatus. Also, this invention relates to a signal recording apparatus such as an audio signal recording apparatus. Furthermore, this invention relates to a recording medium. In addition, this invention relates to an apparatus for an optical disc such as a CD-DA (Compact Disc Digital Audio), a CD-ROM (Compact Disc Read Only Memory), a video-CD, a DVD (Digital Video Disc), a DVD-ROM (Digital Video Disc Read Only Memory), a DVD-WO (Digital Video Disc Write Once), or a DVD-RAM (Digital Video Disc Random Access Memory).

2. Description of the Related Art

The CD (Compact Disc) standards prescribe that the sampling frequency fs should be 44.1 kHz, and the quantization bit number should be 16. There are optical recording discs on which digital signals representing audio information, digital signals representing video information, or digital signals representing both audio information and video information are recorded. Examples of such optical recording discs are a CD-DA (Compact Disc Digital Audio), a CD-ROM (Compact Disc Read Only Memory), a video-CD, and a DVD (Digital Video Disc).

Audio data conforming to the CD-DA standards can not be recorded as audio data of the CD-ROM format for the following reason. The CD-ROM format has headers containing sync information, address information, and mode information. Accordingly, a recording capacity of a CD-ROM which can be used for audio information is smaller than the audio-information recording capacity of a CD-DA.

SUMMARY OF THE INVENTION

It is a first object of this invention to provide an improved signal compressing apparatus.

It is a second object of this invention to provide an improved signal recording apparatus.

It is a third object of this invention to provide an improved recording medium.

It is a fourth object of this invention to provide an improved apparatus for an optical disc.

A first aspect of this invention provides a signal recording apparatus comprising means for quantizing an input signal into a quantization-resultant signal; means for compressing the quantization-resultant signal into a compression-resultant signal; means for formatting the compression-resultant signal into a formatting-resultant signal corresponding to a predetermined format for a digital recording discs the formatting-resultant signal including segments corresponding to user data areas prescribed in the predetermined format, the compression-resultant signal being placed in the segments of the formatting-resultant signal; means for encoding the formatting-resultant signal into an encoding-resultant signal of a CD format; and means for recording the encoding-resultant signal on a recording medium.

A second aspect of this invention is based on the first aspect thereof, and provides a signal recording apparatus wherein the input signal comprises an audio signal.

A third aspect of this invention is based on the first aspect thereof, and provides a signal recording apparatus wherein the predetermined format for the digital recording disc is equal to a predetermined format for a CD-ROM.

A fourth aspect of this invention is based on the first aspect thereof, and provides a signal recording apparatus wherein the predetermined format for the digital recording disc is equal to a predetermined format for a DVD.

A fifth aspect of this invention is based on the first aspect thereof, and provides a signal recording apparatus wherein the compressing means comprises means for subjecting the quantization-resultant signal to orthogonal transform.

A sixth aspect of this invention is based on the fifth aspect thereof, and provides a signal recording apparatus wherein the compressing means comprises means for subjecting the quantization-resultant signal to a Huffman encoding process.

A seventh aspect of this invention is based on the first aspect thereof, and provides a signal recording apparatus wherein the compressing means comprises means for dividing the quantization-resultant signal into components corresponding to divided frequency bands respectively, and means for compressing the components according to frequency-band-dependent compression characteristics depending on a predetermined auditory sensation model.

An eighth aspect of this invention provides a signal compressing apparatus comprising means for quantizing an input signal into a quantization-resultant signal; means for compressing the quantization-resultant signal into a compression-resultant signal; and means for formatting the compression-resultant signal into a formatting-resultant signal corresponding to a predetermined format for a digital recording disc, the formatting-resultant signal including segments corresponding to user data areas prescribed in the predetermined format, the compression-resultant signal being placed in the segments of the formatting-resultant signal.

A ninth aspect of this invention is based on the eighth aspect thereof, and provides a signal compressing apparatus wherein the input signal comprises an audio signal.

A tenth aspect of this invention is based on the eighth aspect thereof, and provides a signal compressing apparatus wherein the predetermined format for the digital recording disc is equal to a predetermined format for a CD-ROM.

An eleventh aspect of this invention is based on the eighth aspect thereof, and provides a signal compressing apparatus wherein the predetermined format for the digital recording disc is equal to a predetermined format for a DVD.

A twelfth aspect of this invention is based on the eighth aspect thereof, and provides a signal compressing apparatus wherein the compressing means comprises means for subjecting the quantization-resultant signal to orthogonal transform.

A thirteenth aspect of this invention is based on the twelfth aspect thereof, and provides a signal compressing apparatus wherein the compressing means comprises means for subjecting the quantization-resultant signal to a Huffman encoding process.

A fourteenth aspect of this invention is based on the eighth aspect thereof, and provides a signal compressing apparatus wherein the compressing means comprises means for dividing the quantization-resultant signal into components corresponding to divided frequency bands respectively, and means for compressing the components according to frequency-band-dependent compression characteristics depending on a predetermined auditory sensation model.

A fifteenth aspect of this invention provides a recording medium storing an encoding-resultant signal which is recorded on the recording medium by the steps of quantizing an input signal into a quantization-resultant signal; compressing the quantization-resultant signal into a compression-resultant signal; formatting the compression-resultant signal into a formatting-resultant signal corresponding to a predetermined format for a digital recording disc, the formatting-resultant signal including segments corresponding to user data areas prescribed in the predetermined format, the compression-resultant signal being placed in the segments of the formatting-resultant signal; encoding the formatting-resultant signal into an encoding-resultant signal of a CD format; and recording the encoding-resultant signal on the recording medium.

A sixteenth aspect of this invention provides an apparatus for an optical disc, comprising a CD-DA decoder; a CD-ROM decoder; a signal expansion decoder; means for reading out a signal from the optical disc; means for deciding which of a CD-DA, a CD-ROM, and a CD-ROM-audio the optical disc agrees with; means for, when the optical disc agrees with a CD-DA, selecting the CD-DA decoder from among the CD-DA decoder, the CD-ROM decoder, and the signal expansion decoder and using the CD-DA decoder to process the signal read out from the optical disc into a recovered signal; means for, when the optical disc agrees with a CD-ROM, selecting the CD-DA decoder and the CD-ROM decoder from among the CD-DA decoder, the CD-ROM decoder, and the signal expansion decoder and using the CD-DA decoder and the CD-ROM decoder to process the signal read out from the optical disc into a recovered signal; and means for, when the optical disc agrees with a CD-ROM-audio, using the CD-DA decoder, the CD-ROM decoder, and the signal expansion decoder to process the signal read out from the optical disc into a recovered signal.

A seventeenth aspect of this invention provides an apparatus for an optical disc, comprising a CD-DA decoder; a CD-ROM decoder; a signal expansion decoder; an MPEG decoder; means for reading out a signal from the optical disc; means for deciding which of a CD-DA, a CD-ROM-audio, and a video-CD the optical disc agrees with; means for, when the optical disc agrees with a CD-DA, selecting the CD-DA decoder from among the CD-DA decoder, the CD-ROM decoder, the signal expansion decoder, and the MPEG decoder and using the CD-DA decoder to process the signal read out from the optical disc into a recovered signal; means for, when the optical disc agrees with a CD-ROM-audio, selecting the CD-DA decoder, the CD-ROM decoder, and the signal expansion decoder from among the CD-DA decoder, the CD-ROM decoder, the signal expansion decoder, and the MPEG decoder and using the CD-DA decoder, the CD-ROM decoder, and the signal expansion decoder to process the signal read out from the optical disc into a recovered signal; and means for, when the optical disc agrees with a video-CD, selecting the CD-DA decoder, the CD-ROM decoder, and the MPEG from among the CD-DA decoder, the CD-ROM decoder, the signal expansion decoder, and the MPEG decoder and using the CD-DA decoder, the CD-ROM decoder, and the MPEG decoder to process the signal read out from the optical disc into a recovered signal.

BRIEF DESCRIPTION OF THE DRAWINGS

FIG. 9 is a flowchart of a segment of a program related to operation of the signal processing circuit in FIG. 7.

FIG. 28 is a flowchart of a segment of a program related to operation of a CPU in FIG. 27.

DESCRIPTION OF THE PREFERRED EMBODIMENTS

First Embodiment

Figure 1:
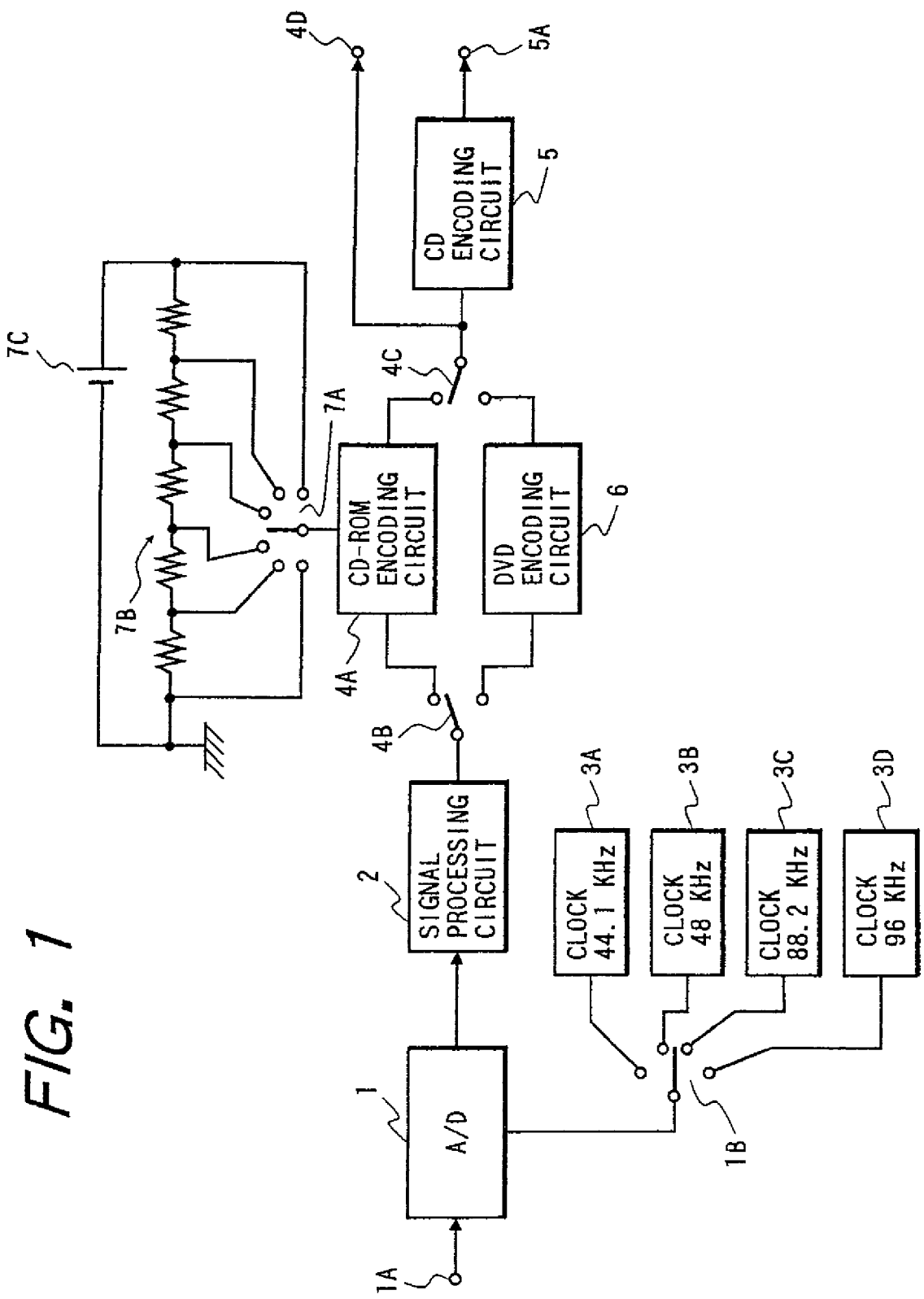
FIG. 1 is a block diagram of a signal compressing apparatus according to a first embodiment of this invention.

With reference to FIG. 1, a signal compressing apparatus has an input terminal 1A connected to the input side of an A/D converter 1. The output side of the A/D converter 1 is connected to the input side of a signal processing circuit 2.

A switch 4B has a movable contact and first and second fixed contacts. The movable contact of the switch 4B is selectively connected to either the first fixed contact or the second fixed contact thereof. The movable contact of the switch 4B is connected to the output side of the signal processing circuit 2. The first fixed contact of the switch 4B leads to the input side of a CD-ROM encoding circuit 4A. The second fixed contact of the switch 4B leads to the input side of a DVD encoding circuit 6.

A switch 4C has a movable contact and first and second fixed contacts. The movable contact of the switch 4C is selectively connected to either the first fixed contact or the second fixed contact thereof. The first fixed contact of the switch 4C is connected to the output side of the CD-ROM encoding circuit 4A. The second fixed contact of the switch 4C is connected to the output side of the DVD encoding circuit 6. The movable contact of the switch 4C leads to an apparatus output terminal 4D. Also, the movable contact of the switch 4C leads to the input side of a CD encoding circuit (a CD-DA encoding circuit) 5. The output side of the CD encoding circuit 5 is connected to an apparatus output terminal 5A.

The switches 4B and 4C cooperate to select either the CD-ROM encoding circuit 4A or the DVD encoding circuit 6 as an effective circuit.

A signal generator 3A outputs a clock signal having a frequency of 44.1 kH. A signal generator 3B outputs a clock signal having a frequency of 48 kHz. A signal generator 3C outputs a clock signal having a frequency of 88.2 kHz. A signal generator 3D outputs a clock signal having a frequency 96 kHz.

A switch 1B has a movable contact, and first, second, third, and fourth fixed contacts. The movable contact of the switch 1B is selectively connected to one of the first, second, third, and fourth fixed contacts thereof. The movable contact of the switch 1B leads to a clock input terminal of the A/D converter 1. The first, the second, third, and fourth fixed contacts of the switch 1B are connected to the output terminals of the signal generators 3A, 3B, 3C, and 3D, respectively. The switch 1B selects one of the output signals of the signal generators 3A, 3B, 3C, and 3D, and transmits the selected signal to the A/D converter 1 as a sampling clock signal.

A switch 7A has a movable contact, and first, second, third, fourth, fifth, and sixth fixed contacts. The movable contact of the switch 7A is selectively connected to one of the first, second, third, fourth, fifth, and sixth fixed contacts thereof. The movable contact of the switch 7A leads the CD-ROM encoding circuit 4A. The first, second, third, fourth, fifth, and sixth fixed contacts of the switch 7A are connected to taps or nodes in a series resistor combination 7B, respectively. The series resistor combination 7B is connected across a fixed-dc-voltage source 7C. The switch 7A selects one of six different voltages available in the series resistor combination 7B, and feeds the selected voltage to the CD-ROM encoding circuit 4A.

For example, the switch 7A can be operated by a user. Operation of the signal compressing apparatus of FIG. 1 can be changed among six different modes. The six different levels of the voltage signal fed via the switch 7A to the CD-ROM encoding circuit 4A are assigned to the six different modes of operation of the apparatus of FIG. 1, respectively. Accordingly, the switch 7A serves as a operation-mode selecting switch, and the voltage signal fed via the switch 7A to the CD-ROM encoding circuit 4A represents an apparatus operation mode desired and selected by the user. Thus, the voltage signal fed via the switch 7A to the CD-ROM encoding circuit 4A is also referred to as the mode signal. As will be made clear later, the switches 1B, 4B, and 4C are linked to the switch 7A.

An analog audio signal is inputted to the A/D converter 1 via the apparatus input terminal 1A. The A/D converter 1 changes the input analog audio signal into a corresponding digital audio signal in response to the sampling clock signal fed via the switch 1B. Specifically, the A/D converter 1 periodically samples the input analog audio signal at a sampling frequency decided by the frequency of the sampling clock signal. The A/D converter 1 changes or quantizes every sample of the input analog audio signal into a corresponding digital audio signal segment (a corresponding audio data piece) with a predetermined quantization bit number. The predetermined quantization bit number is equal to, for example, 16 or 20. The A/D converter 1 outputs the resultant digital audio signal (referred to as the first digital audio signal) to the signal processing circuit 2.

Generally, the input analog audio signal is composed of 2-channel signals. The input analog audio signal may be composed of 4-channel signals, or 6-channel signals.

The signal processing circuit 2 includes a DSP (digital signal processor), a microcomputer, or a similar device having a combination of an input/output port, a processing section, a ROM, and a RAM. The signal processing circuit 2 operates in accordance with a program stored in the ROM.

The signal processing circuit 2 is programmed to compress the first digital audio signal into a second digital audio signal according to a predetermined signal-compression technique including an orthogonal transform process. The predetermined signal-compression technique may also include a Huffman encoding process. In this case, the orthogonal transform process may be omitted from the predetermined signal-compression technique. For example, the predetermined signal-compression technique is selected from among known signal-compression techniques. The signal processing circuit 2 outputs the second digital audio signal (the compression-resultant digital audio signal) to the CD-ROM encoding circuit 4A or the DVD encoding circuit 6 via the switch 4B.

The CD-ROM encoding circuit 4A generates auxiliary information signals (sub information signals) in response to the mode signal. The auxiliary information signals includes a sync signal and a header signal. Specifically, the CD-ROM encoding circuit 4A generates at least a sync signal and a header signal for every sector with respect to a recording medium (a CD-ROM). When the CD-ROM encoding circuit 4A is selected by the switch 4B, the CD-ROM encoding circuit 4A receives the second digital audio signal from the signal processing circuit 2. The CD-ROM encoding circuit 4A combines the sync signal, the header signal, and the second digital audio signal in response to the mode signal on a time-division multiplexing basis for every sector with respect to a recording medium (a CD-ROM). The combination-resultant digital audio signal is of a predetermined format equal to one of the CD-ROM signal formats. The combination-resultant digital audio signal is also referred to as the composite digital audio signal. During combining the signals, the CD-ROM encoding circuit 4A places the second digital audio signal in a time range corresponding to a user data area in every sector with respect to a recording medium (a CD-ROM). When the CD-ROM encoding circuit 4A is selected by the switch 4C, the CD-ROM encoding circuit 4A outputs the combination-resultant digital audio signal (the composite digital audio signal) to the apparatus output terminal 4D and the CD encoding circuit 5.

The DVD encoding circuit 6 generates a header signal for every pack. When the DVD encoding circuit 6 is selected by the switch 4B, the DVD encoding circuit 6 receives the second digital audio signal from the signal processing circuit 2. The DVD encoding circuit 6 combines the header signal and the second digital audio signal on a time-division multiplexing basis for every pack. The combination-resultant digital audio signal is of a predetermined format equal to the DVD signal format. The combination-resultant digital audio signal is also referred to as the composite digital audio signal. During combining the signals, the DVD encoding circuit 6 places the second digital audio signal in a time range corresponding to a user data area or a packet area in every pack. When the DVD encoding circuit 6 is selected by the switch 4C, the DVD encoding circuit 6 outputs the combination-resultant digital audio signal (the composite digital audio signal) to the apparatus output terminal 4D and the CD encoding circuit 5.

The CD encoding circuit 5 converts the output signal of the CD-ROM encoding circuit 4A or the output signal of the DVD encoding circuit 6 into a digital audio signal of a predetermined format equal to the CD-WO (compact disc write once) format or the CD-DA format. The CD encoding circuit 5 feeds the digital audio signal of the CD-WO format or the CD-DA format to the apparatus output terminal 5A.

For example, the CD encoding circuit 5 subjects the output signal of the CD-ROM encoding circuit 4A or the output signal of the DVD encoding circuit 6 to a CIRC (Cross Interleave Reed-Solomon Code) encoding process according to the CD-WO standards or the CD-DA standards. The CD encoding circuit 5 outputs the encoding-resultant digital audio signal to the apparatus output terminal 5A. Specifically, the CD encoding circuit 5 generates an error correction signal in response to the output signal of the CD-ROM encoding circuit 4A or the output signal of the DVD encoding circuit 6, and adds the error correction signal to the output signal of the CD-ROM encoding circuit 4A or the output signal of the DVD encoding circuit 6. The error correction signal uses a cross interleave Reed-Solomon code. The CD encoding circuit 5 feeds the addition-resultant signal to the apparatus output terminal 5A.

Figure 2:
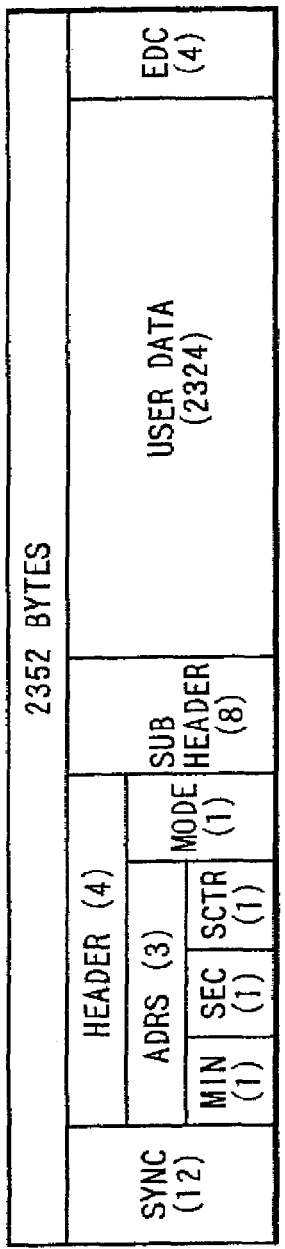
FIG. 2 is a diagram of a first format of a 1-sector-corresponding segment of a digital signal generated by a CD-ROM encoding circuit in FIG. 1.

Operation of the signal compressing apparatus of FIG. 1 can be changed among six different modes. During the first mode of operation, the switch 1B selects the output signal of the signal generator 3A which has a frequency of 44.1 kHz. The switch 1B transmits the selected signal to the A/D converter 1 as a sampling clock signal. Accordingly, during the first mode of operation, the frequency of the signal sampling by the A/D converter 1 is equal to 44.1 kHz. During the first mode of operation, the switches 4B and 4C select the CD-ROM encoding circuit 4A. In this case, the CD-ROM encoding circuit 4A generates a sequence of a sync signal, a header signal, a sub header signal, a user data block, and an EDC signal in response to the mode signal and the second digital audio signal for every sector with respect to a recording medium (a CD-ROM). The user data block contains the second digital audio signal. During the first mode of operation, a 1-sector-corresponding segment of the composite digital audio signal generated by the CD-ROM encoding circuit 4A has a form such as shown in FIG. 2. The user data block has 2,324 bytes.

During the second mode of operation, the switch 1B selects the output signal of the signal generator 3C which has a frequency of 88.2 kHz. The switch 1B transmits the selected signal to the A/D converter 1 as a sampling clock signal. Accordingly, during the second mode of operation, the frequency of the signal sampling by the A/D converter 1 is equal to 88.2 kHz. During the second mode of operation, the switches 4B and 4C select the CD-ROM encoding circuit 4A. In this case, the CD-ROM encoding circuit 4A generates a sequence of a sync signal, a header signal, a sub header signal, a user data block, and an EDC signal in response to the mode signal and the second digital audio signal for every sector with respect to a recording medium (a CD-ROM). The user data block contains the second digital audio signal. During the second mode of operation, a i-sector-corresponding segment of the composite digital audio signal generated by the CD-ROM encoding circuit 4A has a form such as shown in FIG. 2. The user data block has 2,324 bytes.

Figure 3:
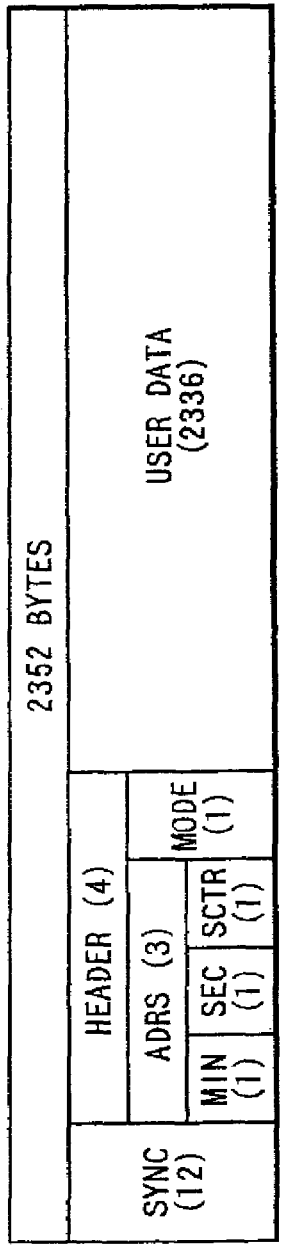
FIG. 3 is a diagram of a second format of a 1-sector-corresponding segment of a digital signal generated by the CD-ROM encoding circuit in FIG. 1.

During the third mode of operation, the switch 1B selects the output signal of the signal generator 3A which has a frequency of 44.1 kHz. The switch 1B transmits the selected signal to the A/D converter 1 as a sampling clock signal. Accordingly, during the third mode of operation, the frequency of the signal sampling by the A/D converter 1 is equal to 44.1 kHz. During the third mode of operation, the switches 4B and 4C select the CD-ROM encoding circuit 4A. In this case, the CD-ROM encoding circuit 4A generates a sequence of a sync signal, a header signal, and a user data block in response to the mode signal and the second digital audio signal for every sector with respect to a recording medium (a CD-ROM). The user data block contains the second digital audio signal. During the third mode of operation, a 1-sector-corresponding segment of the composite digital audio signal generated by the CD-ROM encoding circuit 4A has a form such as shown in FIG. 3. The user data block has 2,336 bytes.

During the fourth mode of operation, the switch 1B selects the output signal of the signal generator 3C which has a frequency of 88.2 kHz. The switch 15 transmits the selected signal to the A/D converter 1 as a sampling clock signal. Accordingly, during the fourth mode of operation, the frequency of the signal sampling by the A/D converter 1 is equal to 88.2 kHz. During the fourth mode of operation, the switches 4B and 4C select the CD-ROM encoding circuit 4A. In this case, the CD-ROM encoding circuit 4A generates a sequence of a sync signal, a header signal, and a user data block in response to the mode signal and the second digital audio signal for every sector with respect to a recording medium (a CD-ROM). The user data block contains the second digital audio signal. During the fourth mode of operation, a 1-sector-corresponding segment of the composite digital audio signal generated by the CD-ROM encoding circuit 4A has a form such as shown in FIG. 3. The user data block has 2,336 bytes.

Figure 4:
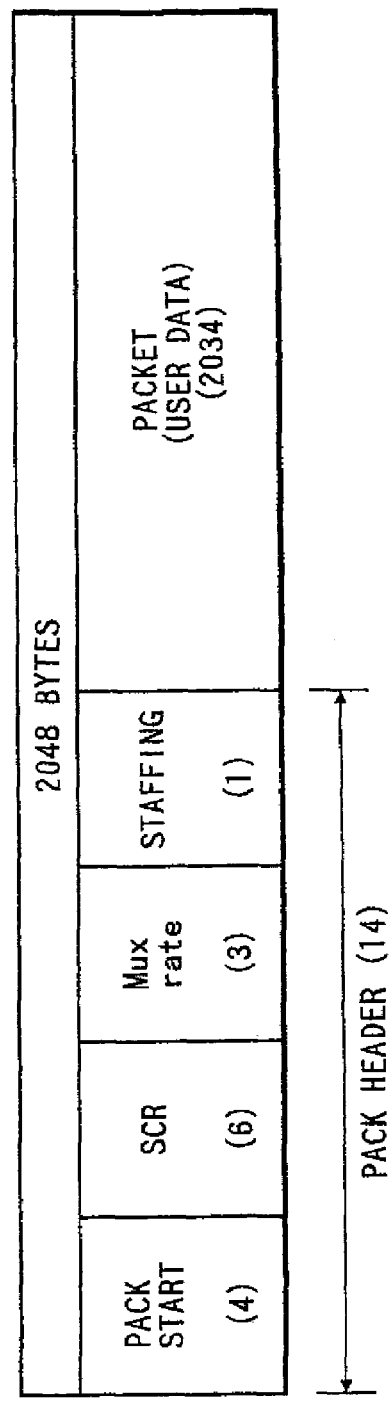
FIG. 4 is a diagram of a format of a 1-pack-corresponding segment of a digital signal generated by a DVD encoding circuit in FIG. 1.

During the fifth mode of operation, the switch 1B selects the output signal of the signal generator 3B which has a frequency of 48 kHz. The switch 1B transmits the selected signal to the A/D converter 1 as a sampling clock signal. Accordingly, during the fifth mode of operation, the frequency of the signal sampling by the A/D converter 1 is equal to 48 kHz. During the fifth mode of operation, the switches 4B and 4C select the DVD encoding circuit 6. In this case, the DVD encoding circuit 6 generates a sequence of a header signal and a user data block (a packet or packets) in response to the second digital audio signal for every pack. The user data block (the pack or packets) contains the second digital audio signal. During the fifth mode of operation, a 1-pack-corresponding segment of the composite digital audio signal generated by the DVD encoding circuit 6 has a form such as shown in FIG. 4. The user data block has 2,034 bytes.

It should be noted that in this specification, a DVD may be another disc in a DVD family such as a DVD-ROM, a DVD-WO, and a DVD-RAM.

During the sixth mode of operation, the switch 1B selects the output signal of the signal generator 3D which has a frequency of 96 kHz. The switch 1B transmits the selected signal to the A/D converter 1 as a sampling clock signal. Accordingly, during the sixth mode of operation, the frequency of the signal sampling by the A/D converter 1 is equal to 96 kHz. During the sixth mode of operation, the switches 4B and 4C select the DVD encoding circuit 6. In this case, the DVD encoding circuit 6 generates a sequence of a header signal and a user data block (a packet or packets) in response to the second digital audio signal for every pack. The user data block (the pack or packets) contains the second digital audio signal. During the sixth mode of operation, a 1-pack-corresponding segment of the composite digital audio signal generated by the DVD encoding circuit 6 has a form such as shown in FIG. 4. The user data block has 2,034 bytes.

The apparatus output terminal 4D can be connected to a transmission line in, for example, a communication network. In this case, the output signal of the CD-ROM encoding circuit 4A or the DVD encoding circuit 6 can be fed to the transmission line before being transmitted therealong.

The apparatus output terminal 4D can be connected to a pre-mastering apparatus or a mastering apparatus for a CD-ROM or a DVD. In this case, the output signal of the CD-ROM encoding circuit 4A or the DVD encoding circuit 6 can be fed to the pre-mastering apparatus or the mastering apparatus before being recorded thereby on a pre-master disc or a master disc for a CD-ROM or a DVD.

The apparatus output terminal 4D can be connected to a recording apparatus. In this case, the output signal of the CD-ROM encoding circuit 4A or the DVD encoding circuit 6 can be fed to the recording apparatus before being recorded thereby on a recording medium such as a magnetic tape or a magnetic disc.

Figure 5:
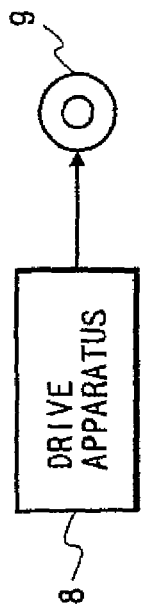
FIG. 5 is a diagram of a drive apparatus and a CD-WO (a compact disc write once).

FIG. 5 shows a drive apparatus 8 for a CD-WO 9. The drive apparatus 8 can be connected to the output terminal 5A in FIG. 1. In this case, the output signal of the CD encoding circuit 5 can be fed to the drive apparatus 8 before being recorded thereby on the CD-WO 9.

Second Embodiment

Figure 6:
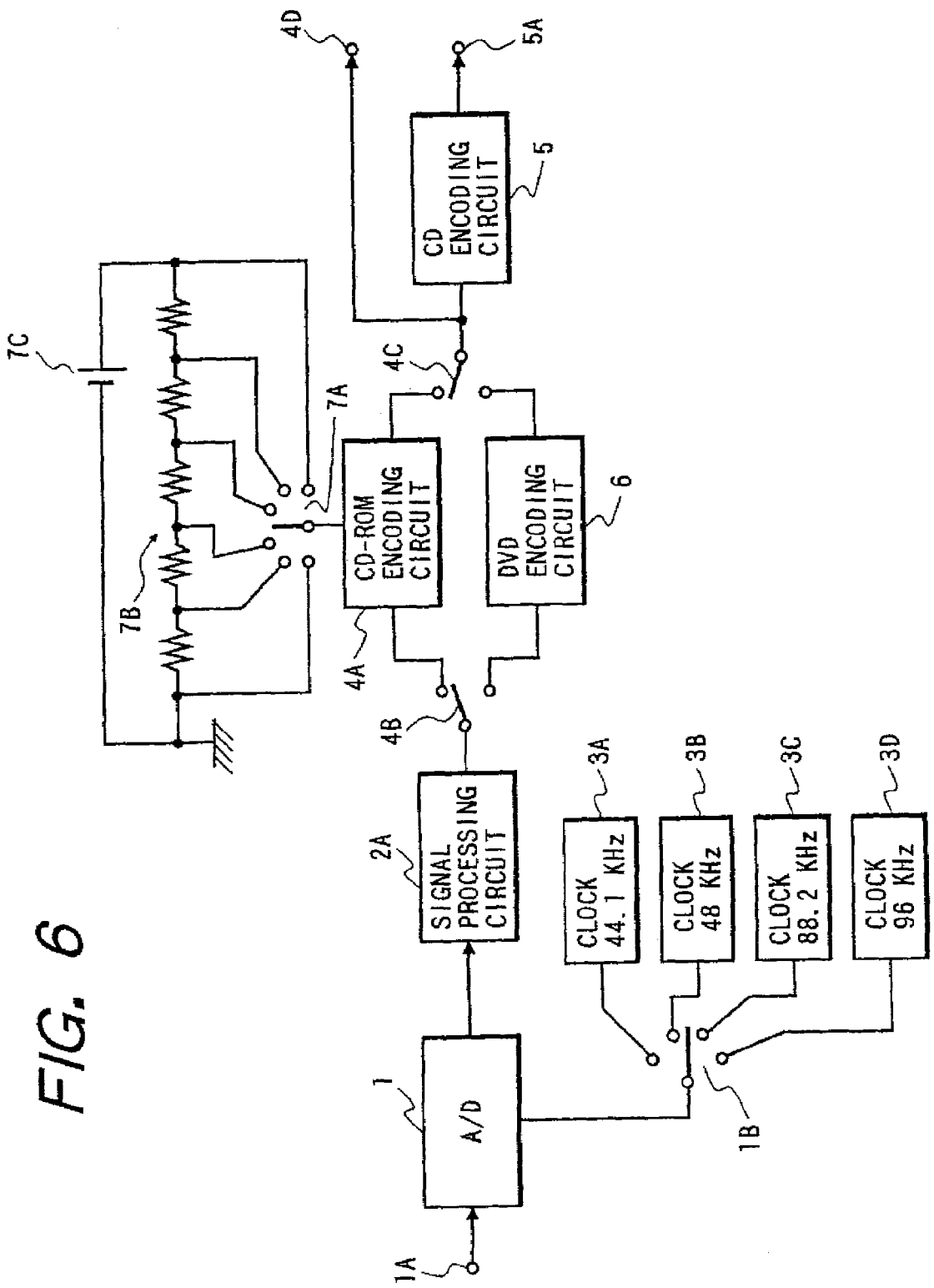
FIG. 6 is a block diagram of a signal compressing apparatus according to a second embodiment of this invention.

FIG. 6 shows a second embodiment of this invention which is similar to the embodiment of FIGS. 1-5 except for the following design change. The embodiment of FIG. 6 uses a signal processing circuit 2A instead of the signal processing circuit 2 in FIG. 1.

An analog audio signal inputted to the A/D converter 1 is composed of 2-channel signals. The input analog audio signal may be composed of 4-channel signals, or 6-channel signals.

The signal processing circuit 2A includes a DSP (digital signal processor), a microcomputer, or a similar device having a combination of an input/output port, a processing section, a ROM, and a RAM. The signal processing circuit 2A operates in accordance with a program stored in the ROM.

The signal processing circuit 2A receives the first digital audio signal from the A/D converter 1. The signal processing circuit 2A is programmed to process the first digital audio signal into a second digital audio signal according to a predetermined signal-compression technique including an orthogonal transform process. The predetermined signal-compression technique may also include a Huffman encoding process. In this case, the orthogonal transform process may be omitted from the predetermined signal-compression technique. The signal processing by the signal processing circuit 2A is implemented block by block. Here, "block" corresponds to a predetermined number "$2^m$" of data pieces of the first digital audio signal per channel.

Specifically, the signal processing circuit 2A subjects a set of $2^m$ data pieces of the first digital audio signal to orthogonal transform, thereby generating a signal representing the frequency spectrum of the first digital audio signal. The signal processing circuit 2A divides the resultant frequency-spectrum signal into signals in different frequency bands by a filtering process. The signal processing circuit 2A normalizes and quantizes each of the frequency-band signals. The signal processing circuit 2A generates helper information representing the conditions of the normalization (for example, the normalization level or the normalization bit number) and the conditions of the quantization. The signal processing circuit 2A combines the normalization/quantization-resultant signals and the helper information. The signal processing circuit 2A subjects the combination-resultant signal to an allocation process. The signal processing circuit 2A outputs the allocation-resultant signal to the switch 4B.

The signal processing circuit 2A may subject the combination-resultant signal to a Huffman encoding process. In this case, the signal processing circuit 2A subjects the encoding-resultant signal to an allocation process. The signal processing circuit 2A outputs the allocation-resultant signal to the switch 4B.

Third Embodiment

Figure 7:
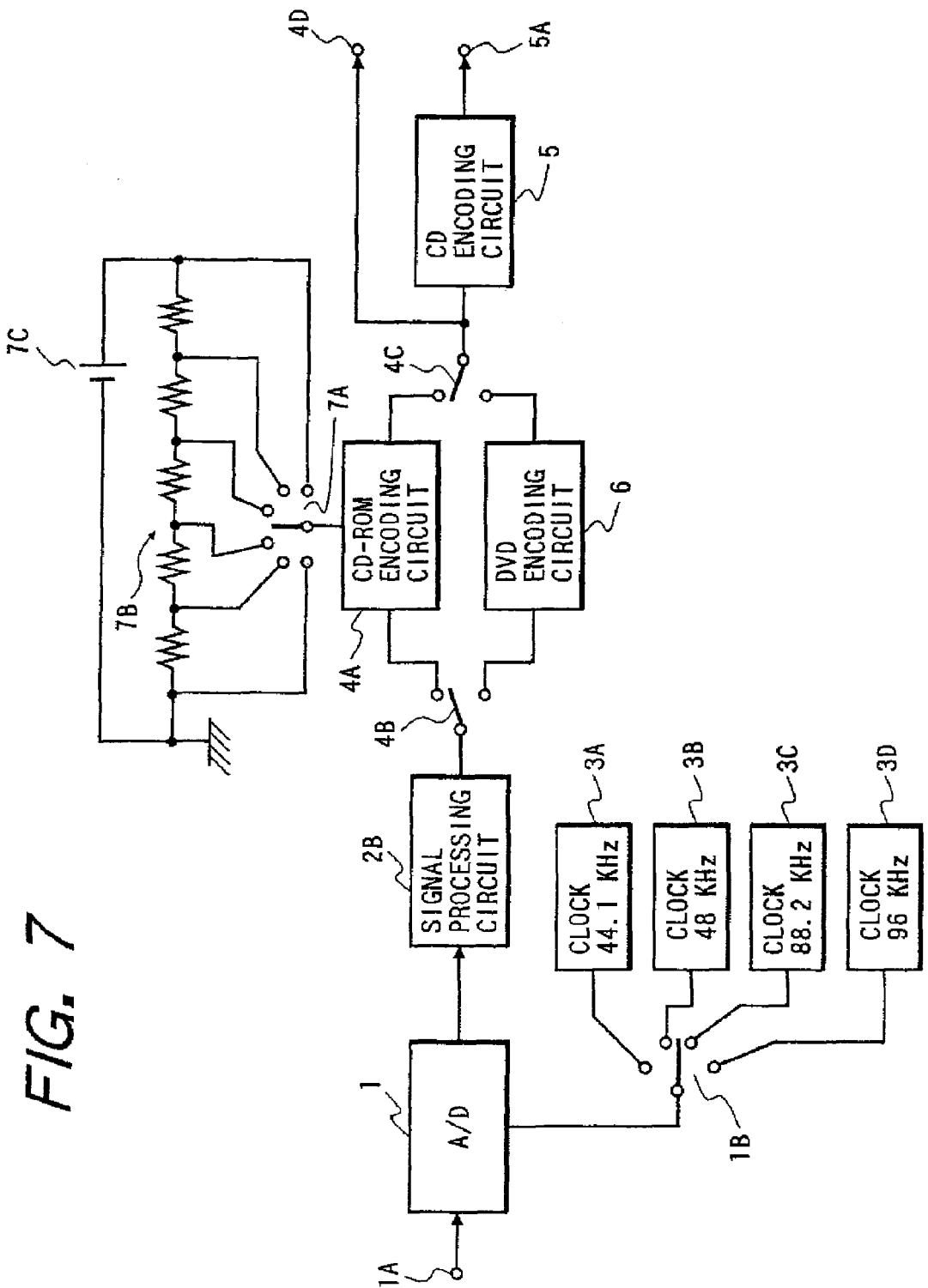
FIG. 7 is a block diagram of a signal compressing apparatus according to a third embodiment of this invention.

FIG. 7 shows a third embodiment of this invention which is similar to the embodiment of FIGS. 1-5 except for the following design change. The embodiment of FIG. 7 uses a signal processing circuit 2B instead of the signal processing circuit 2 in FIG. 1.

The signal processing circuit 2B includes a DSP (digital signal processor), a microcomputer, or a similar device having a combination of an input/output port, a processing section, a ROM, and a RAM. The signal processing circuit 2B operates in accordance with a program stored in the ROM.

The signal processing circuit 213 receives the first digital audio signal from the A/D converter 1. The signal processing circuit 2B is programmed to process the first digital audio signal into a second digital audio signal according to a predetermined signal-compression technique.

Figure 8:
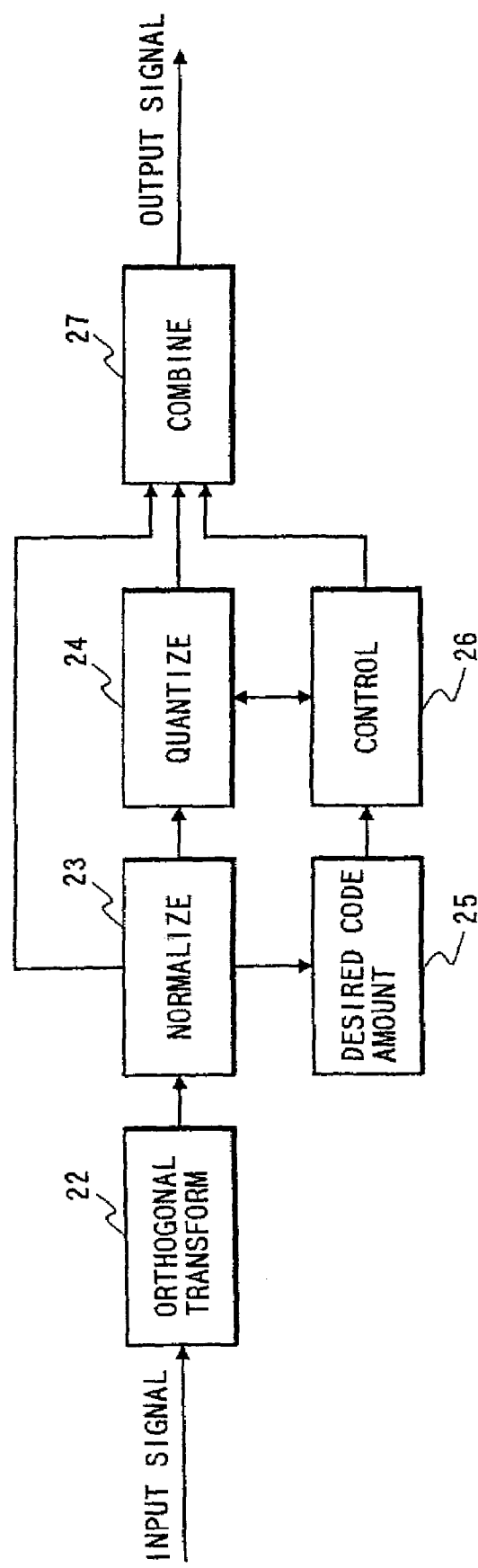
FIG. 8 is a flow diagram of operation of a signal processing circuit in FIG. 7.

FIG. 8 shows a flow of operation of the signal processing circuit 2B. It should be noted that FIG. 8 does not show the hardware structure of the signal processing circuit 2B. With reference to FIG. 8, a block 22 subjects an input signal (that is, the first digital audio signal from the A/D converter 1) to a windowing process and an orthogonal transform process. Preferably, the orthogonal transform process is of the MDCT (modified discrete cosine transform) type. The resultant data representing orthogonal transform coefficients are divided by the block 22 into coefficient-representing data pieces corresponding to different frequency bands respectively.

A block 23 following the block 22 decides scale factors for the coefficient-representing data pieces corresponding to the frequency bands respectively. The block 23 normalizes the coefficient-representing data pieces in response to the decided scale factors respectively. The block 23 informs a block 27 of the decided scale factors.

A block 24 following the block 23 quantizes the normalization-resultant data pieces in response to variable quantization factors (variable quantization steps). The bock 24 may implement the quantization-resultant data pieces to entropy encoding.

A block 25 following the block 23 calculates desired code amounts (desired bit numbers) from the normalization-resultant data pieces for the frequency bands respectively. The minimum audible limit characteristics and the masking effects of a predetermined auditory sensation model are used in calculating the desired code amounts.

A block 26 following the block 25 calculates desired quantization factors (desired quantization steps) from the desired code amounts for the frequency bands respectively. The block 26 informs the block 24 of the desired quantization factors (the desired quantization steps). The block 24 quantizes the normalization-resultant data pieces in response to quantization factors equal to the desired quantization factors. The block 26 informs the block 27 of the desired quantization factors as actual quantization factors used by the block 24.

The block 27 follows the block 24. The block 27 generates helper information such as header information. The block 27 combines the quantization-resultant data pieces, the information of the scale factors, the information of the quantization factors, and the helper information into a bit stream which is an output signal of the signal processing circuit 2B.

FIG. 9 is a flowchart of a segment of the program which corresponds to the blocks 24, 25, and 26 in FIG. 8. Signal processing by the blocks 24, 25, and 26 is implemented frame by frame. Here, "frame" is a predetermined time interval. As shown in FIG. 9, a first step S1 of the program segment decides first quantization bit numbers (first quantization factors) for the frequency bands respectively. Regarding the normalization-resultant data pieces, the step S1 estimates generated bit numbers in response to the decided first quantization bit numbers for the frequency bands respectively. The step S1 calculates a total bit number which equals the sum of the estimated bit numbers.

A step S2 following the step S1 calculates an available bit number in the current frame. A step S3 following the step S2 compares the calculated total bit number and the calculated available bit number to decide whether or not a code amount is insufficient. When the total bit number is greater than the available bit number, that is, when a code amount is insufficient, the program advances from the step S3 to a step S4. Otherwise, the program advances from the step S3 to a step S8.

The step S4 calculates band powers p[i] which are equal to the square of the scale factors for the frequency bands respectively. Here, "i" denotes a variable integer for identifying the frequency bands. The step S4 calculates masking curves m[i] from the calculated band powers p[i] in accordance with the minimum audible limit characteristic and the masking effects of a predetermined auditory sensation model. Specifically, the masking curves m[i] are given by the convolution of model-based reference curves r[i] and the band powers p[i].

A step S5 following the step 34 calculates standard noise levels N[i] from the minimum audible limits abs[i] and the masking curves m[i] for the frequency bands respectively. For example, the calculation of the standard noise levels N[i] uses an equation given as:

$$N[i]=\max[m[i], abs[i]]$$

where "max" denotes an operator for selecting the greater of the values in the brackets.

A step S6 subsequent to the step S5 distributes deleted bits (that is, bits to be deleted) to the frequency bands according to the following rules. First one of the deleted bits is allocated to the frequency band having the highest standard noise level. Then, the standard noise level corresponding to this frequency band is reduced by a predetermined level. Subsequently, second one of the deleted bits is allocated to the frequency band having the highest standard noise level. Then, the standard noise level corresponding to this frequency band is reduced by the predetermined level. These processes are iteratively executed until a final one of the deleted bits is allocated.

In other words, first one of the deleted bits is allocated to the frequency band having the highest standard noise level. Second one of the deleted bits is allocated to the frequency band having the second highest standard noise level. Third one of the deleted bits is allocated to the frequency band having the third highest standard noise level. These processes are iteratively executed until a final one of the deleted bits is allocated. During these processes, when one of the deleted bits is allocated to a frequency band, the standard noise level corresponding to this frequency band is decreased by a predetermined level.

Generally, the shape of the distribution of the deleted bits is similar to the shape formed by the standard noise levels N[i]. The block S6 corrects the first quantization bit numbers (the first quantization factors) into second quantization bit numbers (second quantization factors) in response to the distribution of the deleted bits to the frequency bands respectively. After the step S6, the program advances to a step S7.

The step S8 allocates surplus bits to the frequency bands. The step S8 sets second quantization bit numbers (second quantization factors) equal to the first quantization bit numbers (the first quantization factors) for the frequency bands respectively. After the step S8, the program advances to the step S7.

The step S7 quantizes the normalization-resultant data pieces in response to the second quantization factors (the second quantization bit numbers) of the frequency bands respectively. After the step S7, the current execution cycle of the program segment ends.

Figure 10:
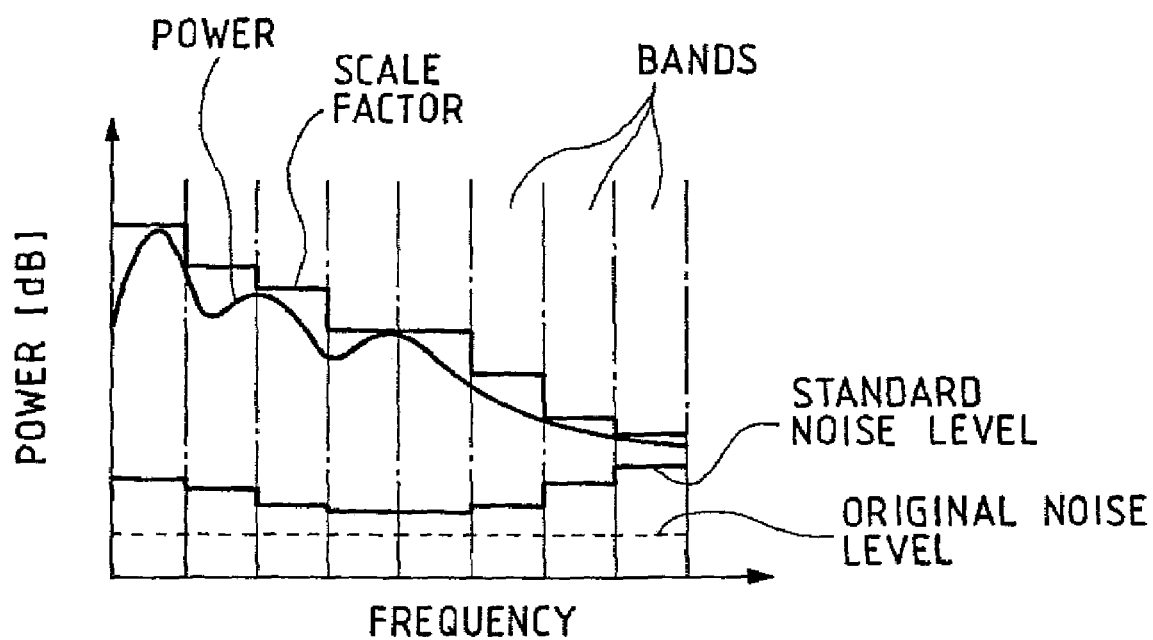
FIG. 10 is a frequency-domain diagram of an example of a signal power, a scale factor, a standard noise level, and an original noise level.

As shown in FIG. 10, the standard noise level varies frequency-band to frequency-band even in the case where the noise level of the original signal is fixed independent of the frequency bands. The stepwise line formed by the standard noise levels is shaped according to the auditory sensation model. The deleted bits are distributed to the frequency bands according to the standard noise levels. Therefore, it is possible to effectively suppress a decrease in tone quality in auditory sensation which would be caused by the quantization.

Fourth Embodiment

Figure 11:
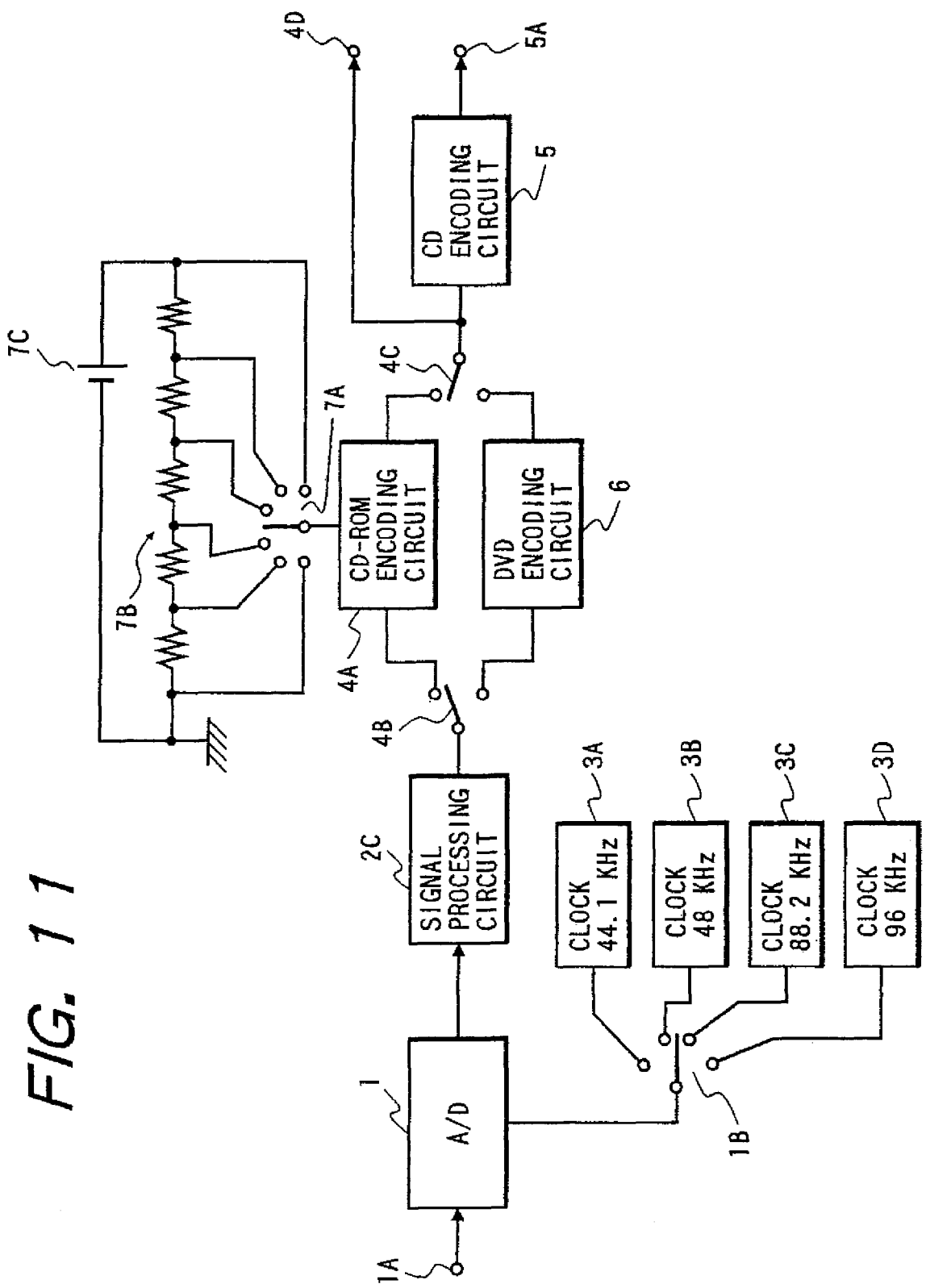
FIG. 11 is a block diagram of a signal compressing apparatus according to a fourth embodiment of this invention.

FIG. 11 shows a fourth embodiment of this invention which is similar to the embodiment of FIGS. 7-10 except for design changes indicated hereinafter. The embodiment of FIG. 11 uses a signal processing circuit 2C instead of the signal processing circuit 2B in FIG. 7.

The signal processing circuit 2C includes a DSP (digital signal processor), a microcomputer, or a similar device having a combination of an input/output port, a processing section, a ROM, and a RAM. The signal processing circuit 2C operates in accordance with a program stored in the ROM.

The signal processing circuit 2C receives the first digital audio signal from the A/D converter 1. The signal processing circuit 2C is programmed to process the first digital audio signal into a second digital audio signal according to a predetermined signal-compression technique.

Figure 12:
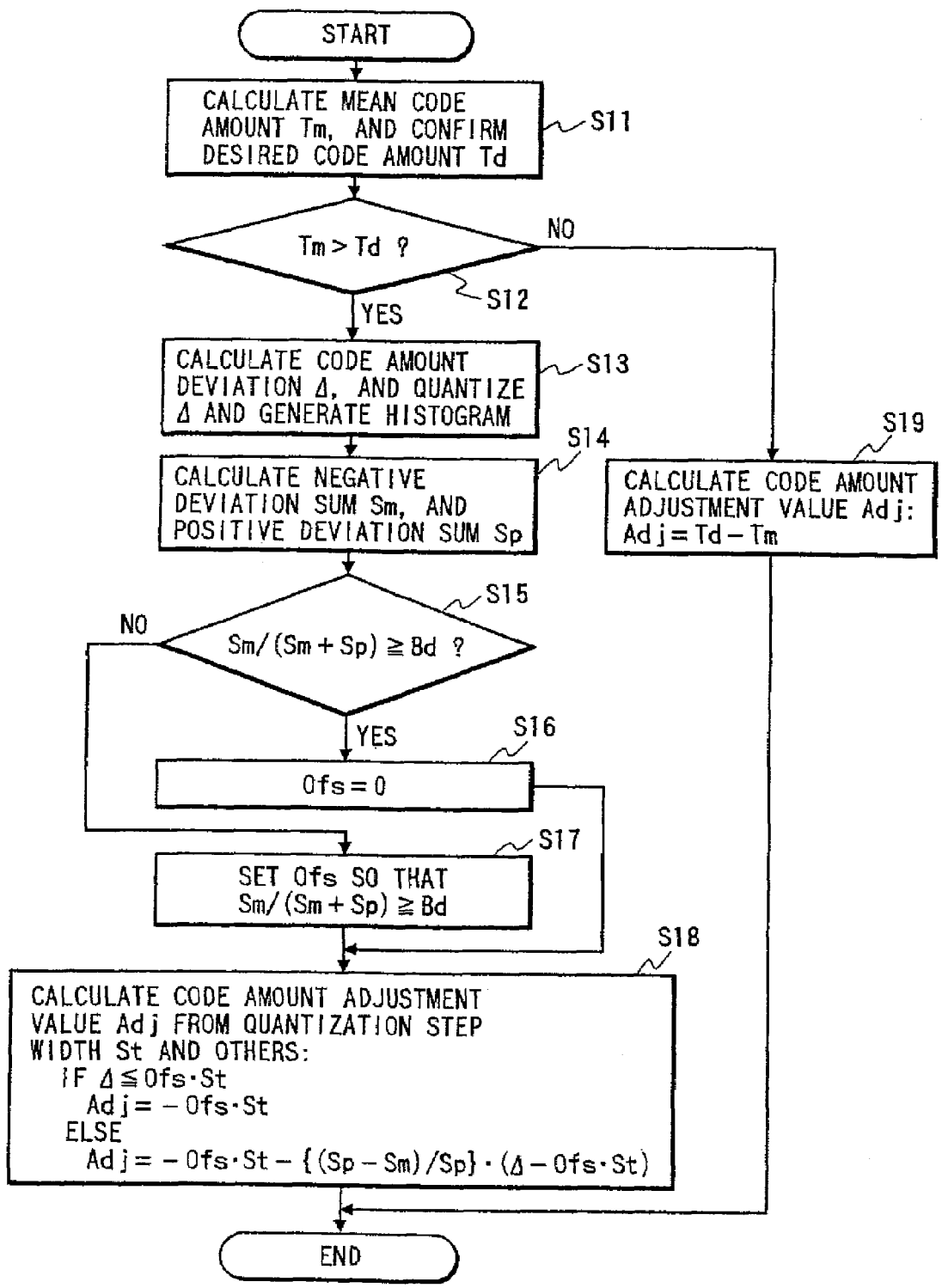
FIG. 12 is a flowchart of a first segment of a program related to operation of a signal processing circuit in FIG. 11.

FIG. 12 is a flowchart of a segment of the program in the signal processing circuit 2C. Generally, the program segment in FIG. 12 is iteratively executed. As shown in FIG. 12, a first step S11 of the program segment fetches information of used code amounts in all time intervals composing an object term. For example, the object term corresponds to the time length of a tune represented by an input audio signal or the sum of the time lengths of all tunes for one disc. The step S11 calculates a mean code amount Tm among the used code amounts. The step S11 fetches information of a desired code amount Td.

A step S12 following the step S11 compares the mean code amount Tm and the desired code amount Td to decide whether an insufficient condition or a surplus condition occurs in code amount. When the mean code amount Tm is greater than the desired code amount Td, that is, when a surplus condition occurs, the program advances from the step S12 to a step S13. Otherwise, the program advances from the step S12 to a step S19.

The step S13 calculates the deviation (the difference) $\Delta$ which is equal to the used code amount minus the desired code amount Td for each of the time intervals. The step S13 quantizes the deviation-$\Delta$-representing data piece in response to a predetermined quantization step width (a predetermined quantization step size) St for each of the time intervals. The quantization step width (the quantization step size) St is expressed in bit number. The step S13 generates a histogram related to the deviations $\Delta$.

A step S14 following the step S13 calculates the deviation sum Sm in negative ranges of the histogram and the deviation sum Sp in positive ranges of the histogram according to equations given as:

$$Sm = \sum_{i=\min}^{-1} \text{histogram}[i] \cdot |i| \cdot St$$

$$Sp = \sum_{i=1}^{\max} \text{histogram}[i] \cdot i \cdot St$$

where "i" denotes an index of the histogram, and "min" and "max" denote an index minimum limit and an index maximum limit respectively.

A step S15 subsequent to the step S14 calculates the ratio "Sm/(Sm+Sp)". The step S15 compares the calculated ratio with a predetermined value Bd equal to, for example, 0.33. When the calculated ratio is equal to or greater than the predetermined value Bd, the program advances from the step S15 to a step S16. Otherwise, the program advances from the step S15 to a step S17.

The step S16 sets an offset value Ofs of the histogram to "0". After the step S16, the program advances to a step S18.

The step S17 sets the offset value Ofs so that the ratio "Sm/(Sm+Sp)" will be equal to or greater than the predetermined value Bd. After the step S17, the program advances to the step S18.

For each of the time intervals, the step S18 compares the deviation $\Delta$ with the product of the offset value Ofs and the quantization step width St. When the deviation $\Delta$ is equal to or smaller than the product "Ofs·St", the step S18 calculates a code amount adjustment value (a code amount corrective value) Adj from the offset value Ofs and the quantization step width St according to the following equation.

$$Adj = -Ofs \cdot t$$

When the deviation $\Delta$ is greater than the product "Ofs·St" the step S18 calculates the code amount adjustment value (the code amount corrective value) Adj according to the following equation.

$$Adj = -Ofs \cdot St - \{(Sp-Sm)/Sp\} \cdot (\Delta - Ofs \cdot St)$$

The step S18 calculates the code amount adjustment value (the code amount corrective value) Adj for each of the time intervals. After the step S18, the current execution cycle of the program segment ends.

For each of the time intervals, the step S19 calculates the code amount adjustment value (the code amount corrective value) Adj from the mean code amount Tm and the desired code amount Td according to the following equation.

$$Adj = Td - Tm$$

After the step S19, the current execution cycle of the program segment ends.

Figure 13:
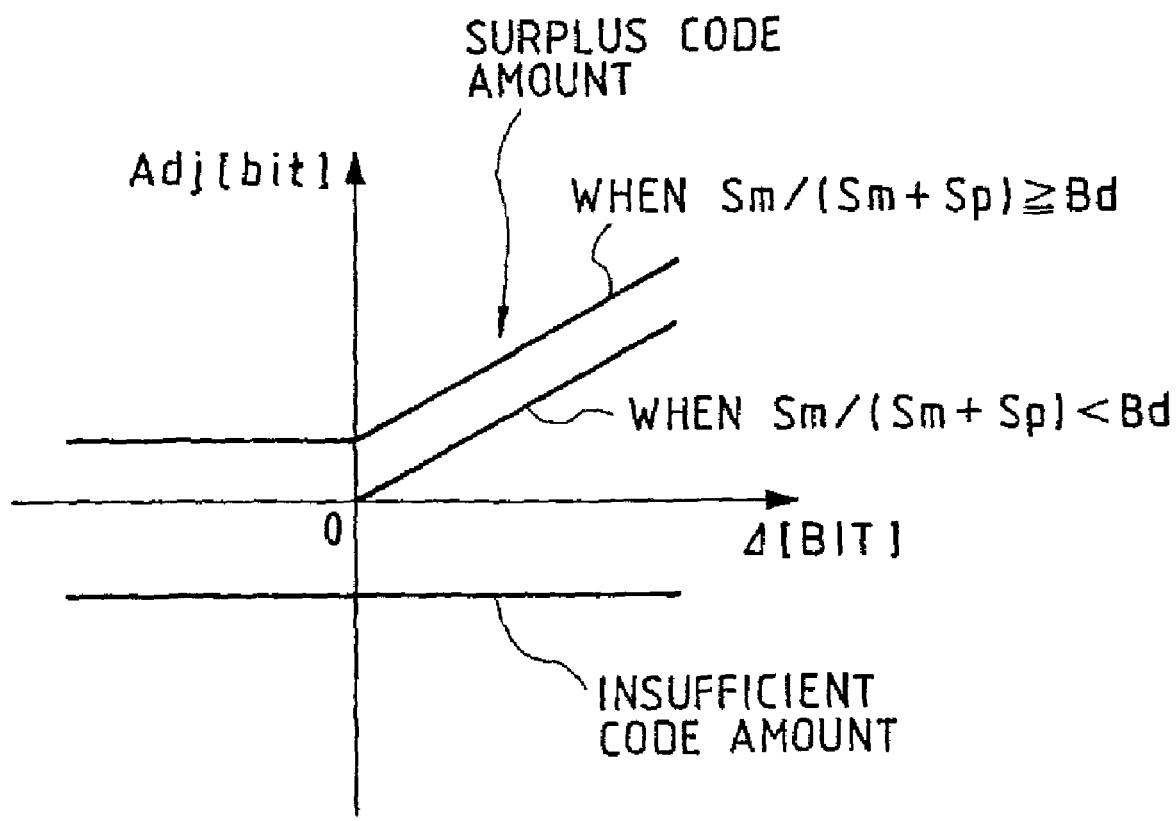
FIG. 13 is a diagram of the relation between a code amount adjustment value Adj and a deviation Δ.

With reference to FIG. 13, the code amount adjustment value (the code amount corrective value) Adj varies as a function of the deviation $\Delta$. Specifically, in a range where the deviation $\Delta$ is positive, the code amount adjustment value (the code amount corrective value) Adj increases as the deviation $\Delta$ increases.

Figure 14:
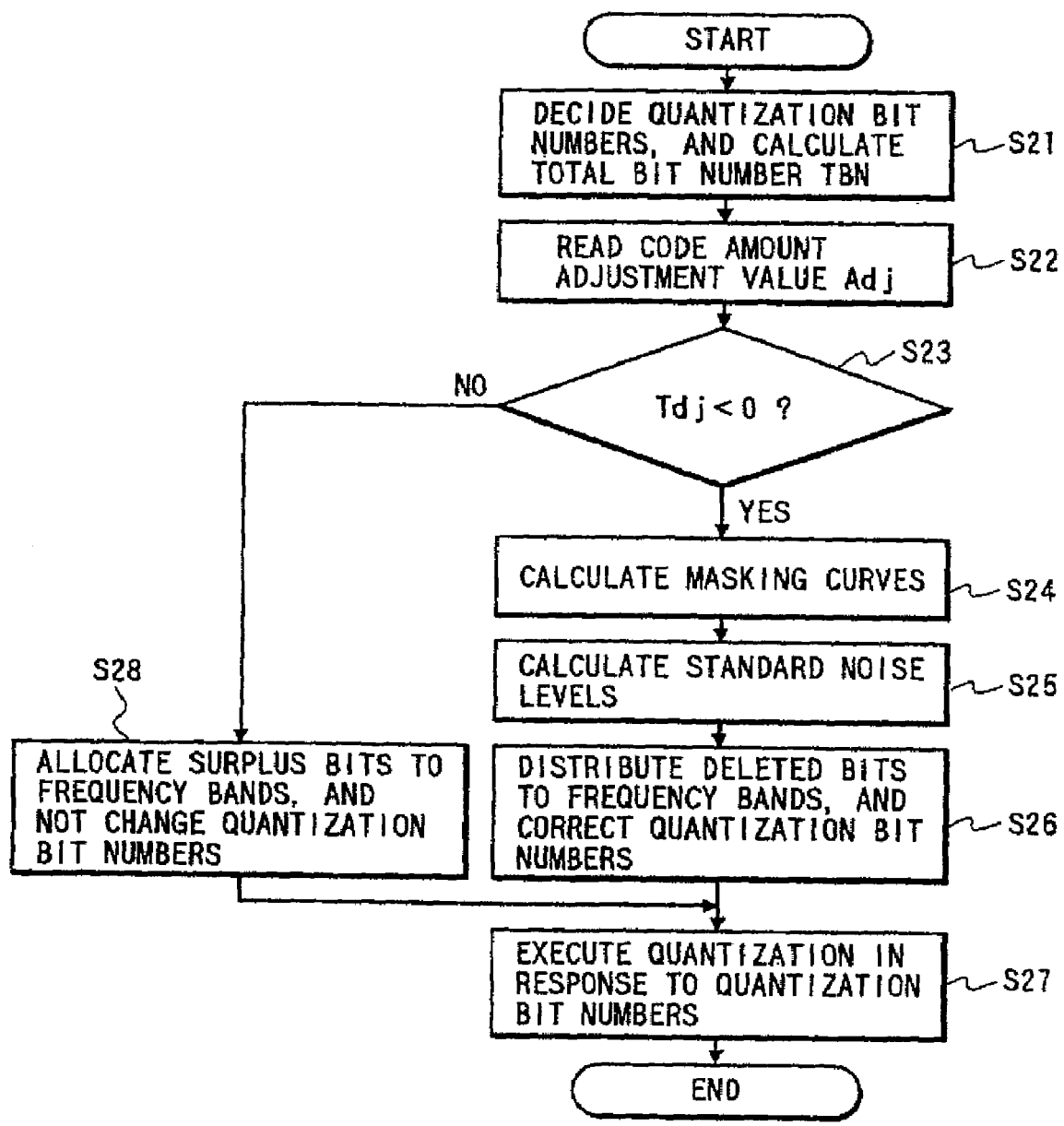
FIG. 14 is a flowchart of a second segment of the program related to operation of the signal processing circuit in FIG. 11.

FIG. 14 is a flowchart of another segment of the program in the signal processing circuit 2C. The program segment in FIG. 14 is executed frame by frame. As shown in FIG. 14, a first step S21 of the program segment decides first quantization bit numbers (first quantization factors) for the frequency bands respectively. Regarding the normalization-resultant data pieces, the step S21 estimates generated bit numbers in response to the decided first quantization bit numbers for the frequency bands respectively. The step S21 calculates a total bit number which equals the sum of the estimated bit numbers.

A step S22 following the step S21 fetches information of the code amount adjustment value (the code amount corrective value) Adj for the current frame.

A step S23 subsequent to the step S22 decides whether or not the code amount adjustment value (the code amount corrective value) Adj is negative. When the code amount adjustment value (the code amount corrective value) Adj is negative, the program advances from the step S23 to a step S24. Otherwise, the program advances from the step S23 to a step S28.

The step S24 calculates band powers p[i] which are equal to the square of the scale factors for the frequency bands respectively. Here, "i" denotes a variable integer for identifying the frequency bands. The step S24 calculates masking curves m[i] from the calculated band powers p[i] in accordance with the minimum audible limit characteristic and the masking effects of a predetermined auditory sensation model. Specifically, the masking curves m[i] are given by the convolution of model-based reference curves r[i] and the band powers p[i].

A step S25 following the step S24 calculates standard noise levels N[i] from the minimum audible limits abs[i] and the masking curves m[i] for the frequency bands respectively. For example, the calculation of the standard noise levels N[i] uses an equation given as:

$$N[i] = \max[m[i], abs[i]]$$

where "max" denotes an operator for selecting the greater of the values in the brackets.

A step S26 subsequent to the step S25 distributes deleted bits (that is, bits to be deleted) to the frequency bands according to the following rules. First one of the deleted bits is allocated to the frequency band having the highest standard noise level. Then, the standard noise level corresponding to this frequency band is reduced by a predetermined level. Subsequently, second one of the deleted bits is allocated to the frequency band having the highest standard noise level. Then, the standard noise level corresponding to this frequency band is reduced by the predetermined level. These processes are iteratively executed until a final one of the deleted bits is allocated.

In other words, first one of the deleted bits is allocated to the frequency band having the highest standard noise level. Second one of the deleted bits is allocated to the frequency band having the second highest standard noise level. Third one of the deleted bits is allocated to the frequency band having the third highest standard noise level. These processes are iteratively executed until a final one of the deleted bits is allocated. During these processes, when one of the deleted bits is allocated to a frequency band, the standard noise level corresponding to this frequency band is decreased by a predetermined level.

Generally, the shape of the distribution of the deleted bits is similar to the shape formed by the standard noise levels N[i]. The block S26 corrects the first quantization bit numbers (the first quantization factors) into second quantization bit numbers (second quantization factors) in response to the distribution of the deleted bits to the frequency bands respectively. After the step S26, the program advances to a step S27.

The step S28 allocates surplus bits to the frequency bands. The step S28 sets second quantization bit numbers (second quantization factors) equal to the first quantization bit numbers (the first quantization factors) for the frequency bands respectively. After the step S28, the program advances to the step S27.

The step S27 quantizes the normalization-resultant data pieces in response to the second quantization factors (the second quantization bit numbers) of the frequency bands respectively. After the step S27, the current execution cycle of the program segment ends.

Fifth Embodiment

Figure 15:
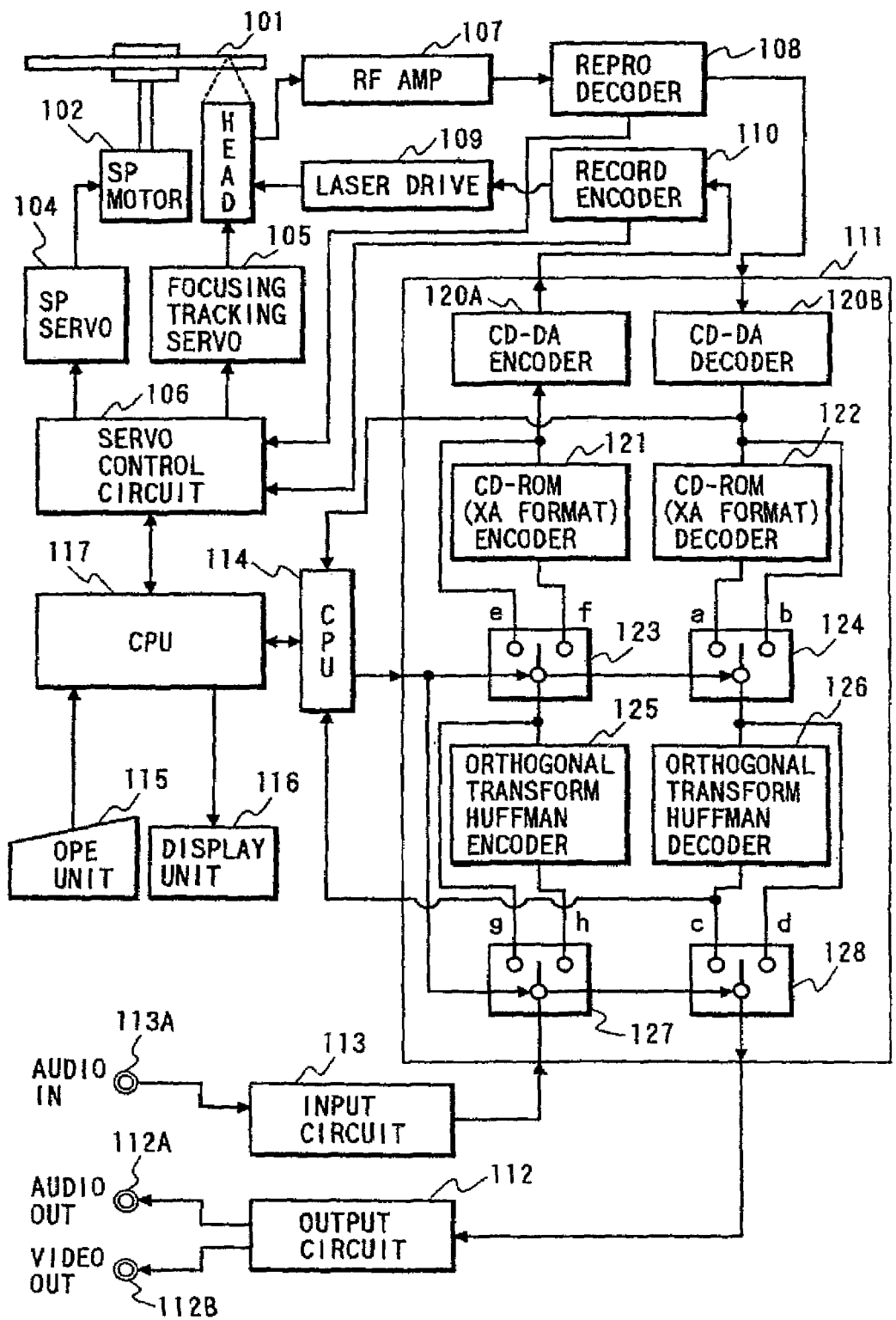
FIG. 15 is a block diagram of an apparatus for an optical disc according to a fifth embodiment of this invention.

FIG. 15 shows an apparatus for an optical disc 101 which can be selected from among various discs such as a CD-DA, a CD-ROM, and a CD-ROM-audio. The apparatus of FIG. 15 includes a spindle motor 102, an optical head 103, a spindle motor servo section 104, a focusing tracking servo section 105, and a servo control circuit 106. The spindle motor servo section 104 is connected between the spindle motor 102 and the servo control circuit 106. The focusing tracking servo section 105 is connected between the optical head 103 and the servo control circuit 106.

The optical disc 101 can be placed into and out of a normal position within the apparatus of FIG. 15. The spindle motor 102 serves to rotate the optical disc 101 placed in the normal position. The spindle motor servo section 104 controls the spindle motor 104 in response to an output signal of the servo control circuit 106 to implement control of the rotational speed of the optical disc 101. The focusing tracking servo section 105 controls the optical head 103 in response to output signals of the servo control circuit 106 to implement focusing control of the optical head 103 and tracking control of the optical head 103.

The optical head 103 is electrically connected to an RF amplifier 107 followed by a reproducing decoder 108. During a playback mode of operation of the apparatus of FIG. 15, the optical head 103 reads out information from the optical disc 101, and outputs an RF signal representing the read-out information. The output signal of the optical head 103 is amplified by the RF amplifier 107. The amplification-resultant signal is outputted from the RF amplifier 107 to the reproducing decoder 108. The reproducing decoder 108 subjects the output signal of the RF amplifier 107 to EFM demodulation, thereby recovering data corresponding to the information recorded on the optical disc 101.

The optical head 103 is electrically connected to a laser drive section 109 following a recording encoder 110. During a recording mode of operation of the apparatus of FIG. 15, the recording encoder 110 subjects recorded data (data to be recorded) to EFM modulation. The recording encoder 110 outputs the modulation-resultant signal to the laser drive section 109. The optical head 103 generates a laser light beam. The optical head 103 applies the laser light beam to the optical disc 101. The laser drive section 109 controls the power or the intensity of the laser light beam in response to the output signal of the recording encoder 110 so that information corresponding to the recorded data can be recorded on the optical disc 101.

The servo control circuit 106 is connected to the reproducing decoder 108, the recording encoder 110, and a CPU 117. The servo control circuit 106 adjusts the spindle motor servo section 104 and the focusing tracking servo section 105 in response to output signals of the reproducing decoder 108, the recording encoder 110, and the CPU 117.

A signal processing circuit 111 is connected to the reproducing decoder 108 and the recording encoder 110. The signal processing circuit 111 is connected to apparatus output terminals 112A and 112B via an output circuit 112. An apparatus input terminal 113A is connected to the signal processing circuit 111 via an input circuit 113.

During the playback mode of operation of the apparatus of FIG. 15, the reproducing decoder 108 outputs the recovered data to the signal processing circuit 111. The signal processing circuit 111 processes the recovered data. The signal processing circuit 111 outputs the processing-resultant data to the output circuit 112. The output circuit 112 has a section which separates the processing-resultant data into audio data and video data. The output circuit 112 has a first D/A converter which changes the audio data into a corresponding analog audio signal. The output circuit 112 feeds the analog audio signal to the apparatus output terminal 112A. The output circuit 112 has a second D/A converter which changes the video data into a corresponding analog video signal. The output circuit 112 feeds the analog video signal to the apparatus output terminal 112B.

During the recording mode of operation of the apparatus of FIG. 15, an input analog audio signal to be recorded travels to the input circuit 113 via the apparatus input terminal 113A. The input circuit 113 has an A/D converter which changes the input analog audio signal into a corresponding digital audio signal. The input circuit 113 feeds the digital audio signal to the signal processing circuit 111. The signal processing circuit 111 processes the digital audio signal into recorded data (data to be recorded). The signal processing circuit 111: outputs the recorded data to the recording encoder 110.

As previously explained, the CPU 117 is connected to the servo control circuit 106. The CPU 117 is also connected to a CPU 114. an operation unit 115, and a display unit 116. Operation of the apparatus of FIG. 15 is changeable among different modes including the playback mode and the recording mode. The operation unit 115 has keys for selecting and designating one out of the different modes of operation of the apparatus of FIG. 15. The keys in the operation unit 115 can be operated by a user. The operation unit 115 informs the CPU 117 of the currently designated operation mode.

The operation unit 115 has a button for selecting and designating one out of different formats. The button in the operation unit 115 can be operated by the user. The operation unit 115 informs the CPU 117 of the currently designated format.

The CPU 117 has a combination of an input/output port, a processing section, a ROM, and a RAM. The CPU 117 operates in accordance with a program stored in the ROM. The CPU 117 is programmed to implement the following processes. The CPU 117 transfers the information of the currently designated operation mode and the information of the currently designated format to the CPU 114. The CPU 117 communicates with the servo control circuit 106. The CPU 117 communicates with the CPU 114. The CPU 117 generates a display signal in response to the information from the operation unit 115, information from the servo control circuit 106, and information from the CPU 114. The CPU 117 outputs the display signal to the display unit 116. The display signal is indicated by the display unit 116.

As previously indicated, the CPU 114 is connected to the CPU 117. The CPU 114 is also connected to the signal processing circuit 111. The CPU 114 has a combination of an input/output port, a processing section, a ROM, and a RAM. The CPU 114 operates in accordance with a program stored in the ROM. The CPU 114 is programmed to control the signal processing circuit 111 in response to information from the CPU 117.

The signal processing circuit 111 includes a CD-DA encoder 120A a CD-DA decoder 120B, a CD-ROM encoder 121, a CD-ROM decoder 122, switches 123 and 124, an orthogonal transform/Huffman encoder 125, an orthogonal transform/Huffman decoder 126, and switches 127 and 128.

The input side of the CD-DA decoder 120B is connected to the output side of the reproducing decoder 108. The output side of the CD-DA decoder 120B is connected to the input side of the CD-ROM decoder 122. The output side of the CD-DA decoder 120B is also connected to the CPU 114. The switch 124 has a movable contact and fixed contacts "a" and "b". The switch 124 has a control terminal. The switch 124 is changeable among three different states in response to a signal fed to the control terminal. When the switch 124 assumes a first state, the movable contact thereof connects with the fixed contact "a" thereof and disconnects from the fixed contact "b" thereof. When the switch 124 assumes a second state, the movable contact thereof connects with the fixed contact "b" thereof and disconnects from the fixed contact "a" thereof. When the switch 124 assumes a third state, the movable contact thereof connects with neither the fixed contact "a" thereof nor the fixed contact "b" thereof. The control terminal of the switch 124 is connected to the CPU 114. The fixed contact "a" of the switch 124 leads from the output side of the CD-ROM decoder 122. The fixed contact "b" of the switch 124 leads from the output side of the CD-DA decoder 120B. The movable contact of the switch 124 leads to the input side of the orthogonal transform/Huffman decoder 126.

The switch 128 has a movable contact and fixed contacts "c" and "d". The switch 128 has a control terminal. The switch 128 is changeable among three different states in response to a signal fed to the control terminal. When the switch 128 assumes a first state, the movable contact thereof connects with the filed contact "c" thereof and disconnects from the fixed contact "d" thereof. When the switch 128 assumes a second state, the movable contact thereof connects with the fixed contact "d" thereof and disconnects from the fixed contact "c" thereof. When the switch 128 assumes a third state, the movable contact thereof connects with neither the fixed contact "c" thereof nor the fixed contact "d" thereof. The control terminal of the switch 128 is connected to the CPU 114. The fixed contact "c" of the switch 128 leads from the output side of the orthogonal transform/Huffman decoder 126. The fixed contact "d" of the switch 128 leads from the movable contact of the switch 124. The movable contact of the switch 128 leads to the input side of the output circuit 112. The output side of the orthogonal transform/Huffman decoder 126 is connected to the CPU 114.

The switch 127 has a movable contact and fixed contacts "g" and "h". The switch 127 has a control terminal. The switch 127 is changeable among three different states in response to a signal fed to the control terminal. When the switch 127 assumes a first state, the movable contact thereof connects with the fixed contact "g" thereof and disconnects from the fixed contact "h" thereof. When the switch 127 assumes a second state, the movable contact thereof connects with the fixed contact "h" thereof and disconnects from the fixed contact "g" thereof. When the switch 127 assumes a third state, the movable contact thereof connects with neither the fixed contact "g" thereof nor the fixed contact "h" thereof. The control terminal of the switch 127 is connected to the CPU 114. The movable contact of the switch 127 leads from the output side of the input circuit 113. The fixed contact "h" of the switch 127 leads to the input side of the orthogonal transform/Huffman encoder 125.

The switch 123 has a movable contact and fixed contacts "e" and "f". The switch 123 has a control terminal. The switch 123 is changeable among three different states in response to a signal fed to the control terminal. When the switch 123 assumes a first state, the movable contact thereof connects with the fixed contact "e" thereof and disconnects from the fixed contact "f" thereof. When the switch 123 assumes a second state, the movable contact thereof connects with the fixed contact "f" thereof and disconnects from the fixed contact "e" thereof. When the switch 123 assumes a third state, the movable contact thereof connects with neither the fixed contact "e" thereof nor the fixed contact "f" thereof. The control terminal of the switch 123 is connected to the CPU 114. The movable contact of the switch 123 leads from the fixed contact "g" of the switch 127 and the output side of the orthogonal transform/Huffman encoder 125. The fixed contact "e" of the switch 123 leads to the input side of the CD-DA encoder 120A. The fixed contact "f" of the switch 123 leads to the input side of the CD-ROM encoder 121. The output side of the CD-ROM encoder 121 is connected to the input side of the CD-DA encoder 120A. The output side of the CD-DA encoder 120A is connected to the input side of the recording encoder 110.

The CPU 114 is programmed to control the switches 123, 124, 127, and 128 in the signal processing circuit 111 as follows. It is assumed that the user designates the recording mode of operation of the apparatus of FIG. 15 by actuating the operation unit 115. In this case, the user also designates the format by actuating the operation unit 115. Generally, the designated format corresponds to the standards of an optical disc 101 set in the normal position within the apparatus of FIG. 15. The operation unit 115 informs the CPU 117 that the recording mode of operation is currently designated. Also, the operation unit 115 informs the CPU 117 of the currently designated format. The CPU 117 transfers the information of the currently designated operation mode and the currently designated format to the CPU 114. When the CPU 114 is informed that the recording mode of operation is currently designated, the CPU 114 sets the switches 124 and 128 in their third states. In this case, the movable contact of the switch 124 separates from both the fixed contacts "a" and "b"

thereof while the movable contact of the switch 128 separates from both the fixed contacts "c" and "d" thereof. Therefore, none of the orthogonal transform/Huffman decoder 126, the CD-ROM decoder 122, and the CD-DA decoder 120B is connected to the output circuit 112. The CPU 114 recognizes the currently designated format. When the currently designated format agrees with the CD-DA format, the CPU 114 controls the switches 123 and 127 so that the movable contact of the switch 123 connects with the fixed contact "e" thereof and the movable contact of the switch 127 connects with the fixed contact "g" thereof. Therefore, the CD-DA encoder 120A is connected to the input circuit 113 while the CD-ROM encoder 121 and the orthogonal transform/Huffman encoder 125 are disconnected from the input circuit 113. When the currently designated format agrees with the CD-ROM format, the CPU 114 controls the switches 123 and 127 so that the movable contact of the switch 123 connects with the fixed contact "f" thereof and the movable contact of the switch 127 connects with the fixed contact "g" thereof. Therefore, the CD-ROM encoder 121 is connected to the input circuit 113 while the orthogonal transform/Huffman encoder 125 is disconnected from the input circuit 113. When the currently designated format agrees with the CD-ROM-audio format, the CPU 114 controls the switches 123 and 127 so that the movable contact of the switch 123 connects with the fixed contact "f" thereof and the movable contact of the switch 127 connects with the fixed contact "h" thereof. Therefore, the orthogonal transform/Huffman encoder 125 is connected to the input circuit 113 while the CD-ROM encoder 121 is connected to the orthogonal transform/Huffman encoder 125.

During the recording mode of operation of the apparatus of FIG. 15, the servo control circuit 106 adjusts the spindle servo section 104 to optimize the rotational speed of the spindle motor 102, that is, the rotational speed of the optical disc 101. In addition, the servo control circuit 106 adjusts the focusing tracking servo section 105 to optimize focusing and tracking conditions of the optical head 103 relative to the optical disc 101. At a start of the recording mode of operation of the apparatus of FIG. 15, the CPU 117 informs the servo control circuit 106 of a desired initial position of the optical head 103 relative to the optical head 101. The servo control circuit 106 adjusts the focusing tracking servo section 105 in response to the positional information from the CPU 117, thereby setting the optical head 103 in a position equal to the desired initial position. During the recording mode of operation of the apparatus of FIG. 15, the servo control circuit 106 adjusts the focusing tracking servo section 105 to move the optical head 103 from the initial position to scan the optical disc 101.

During the recording mode of operation of the apparatus of FIG. 15, an input analog audio signal to be recorded travels to the input circuit 113 via the apparatus input terminal 113A. The input circuit 113 changes the input analog audio signal into a corresponding digital audio signal. In the case where the currently designated format agrees with the CD-DA format, the digital audio signal is transmitted from the input circuit 113 to the CD-DA encoder 120A. The CD-DA encoder 120A subjects the digital audio signal to a CIRC (Cross Interleave Reed-Solomon Code) encoding process according to the CD-DA standards. The CD-DA encoder 120A outputs the encoding-resultant digital audio signal to the recording encoder 110 as recorded data (data to be recorded) of the CD-DA format. Specifically, the CD-DA encoder 120A generates an error correction signal in response to the digital audio signal, and adds the error correction signal to the digital audio signal. The error correction signal uses a cross interleave Reed-Solomon code. The CD-DA encoder 120A outputs the addition-resultant signal to the recording encoder 110. The recording encoder 110 subjects the recorded data of the CD-DA format to the EFM modulation. The recording encoder 110 outputs the modulation-resultant signal to the laser drive section 109. The optical bead 103 generates a laser light beam. The optical head 103 applies the laser light beam to the optical disc 101. The laser drive section 109 controls the power or the intensity of the laser light beam in response to the output signal of the recording encoder 110 so that information corresponding to the recorded data of the CD-DA format is recorded on the optical disc 101. Furthermore, TOC information related to the recorded data is generated, and the TOC information is recorded on an inner area of the optical disc 101.

During the recording mode of operation of the apparatus of FIG. 15, when the currently designated format agrees with the CD-ROM format, the digital audio signal is transmitted from the input circuit 113 to the CD-ROM encoder 121. The CD-ROM encoder 121 subjects the digital audio signal to a CD-ROM encoding process including an interleaving process according to the CD-ROM (XA) standards. The CD-ROM encoder 121 outputs the process-resultant digital audio signal to the CD-DA encoder 120A. The CD-DA encoder 120A subjects the output signal of the CD-ROM encoder 121 to the CIRC encoding process. The CD-DA encoder 120A outputs the encoding-resultant digital audio signal to the recording encoder 110 as recorded data (data to be recorded) of the CD-ROM format. The recording encoder 110 subjects the recorded data of the CD-ROM format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM format is recorded on the optical disc 101. Furthermore, TOC information related to the recorded data is generated, and the TOC information is recorded on the inner area of the optical disc 101.

During the recording mode of operation of the apparatus of FIG. 15, when the currently designated format agrees with the CD-ROM-audio format, the digital audio signal is transmitted from the input circuit 113 to the orthogonal transform/Huffman encoder 125. The orthogonal transform/Huffman encoder 125 subjects the digital audio signal to orthogonal transform and a Huffman encoding process to compress the digital audio signal. The orthogonal transform/Huffman encoder 125 outputs the resultant digital audio signal to the CD-ROM encoder 121. The CD-ROM encoder 121 subjects the output signal of the orthogonal transform/Huffman encoder 125 to the CD-ROM encoding process including the interleaving process. The CD-ROM encoder 121 outputs the process-resultant digital audio signal to the CD-DA encoder 120A. The CD-DA encoder 120A subjects the output signal of the CD-ROM encoder 121 to the CIRC encoding process. The CD-DA encoder 120A outputs the encoding-resultant digital audio signal to the recording encoder 110 as recorded data (data to be recorded) of the CD-ROM-audio format. The recording encoder 110 subjects the recorded data of the CD-ROM-audio format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM-audio format is recorded on the optical disc 101.

Furthermore, TOC information related to the recorded data is generated, and the TOC information is recorded on the inner area of the optical disc 101.

It is assumed that the user places an optical disc 101 in the normal position within the apparatus of FIG. 15, and then designates the playback mode of operation of the apparatus of FIG. 15 by actuating the operation unit 115. The operation control unit 115 informs the CPU 117 that the playback mode of operation is currently designated. In this case, the CPU 117 starts the apparatus of FIG. 15 to operate in the playback mode. During the playback mode of operation of the apparatus of FIG. 15, the servo control circuit 106 adjusts the spindle servo section 104 to optimize the rotational speed of the spindle motor 102, that is, the rotational speed of the optical disc 101. In addition, the servo control circuit 106 adjusts the focusing tracking servo section 105 to optimize focusing and tracking conditions of the optical head 103 relative to the optical disc 101. On the other hand, the optical head 103 reads out information from the optical disc 101, and outputs an RF signal representing the read-out information. The output signal of the optical head 103 is amplified by the RF amplifier 107. The amplification-resultant signal is outputted from the RF amplifier 107 to the reproducing decoder 108. The reproducing decoder 108 subjects the output signal of the RF amplifier 107 to the EFM demodulation, thereby recovering data corresponding to the information recorded on the optical disc 101. The reproducing decoder 108 outputs the recovered data to the CD-DA decoder 120B. The CD-DA decoder 120B subjects the output signal of the reproducing decoder 108 to a CIRC decoding process (an error correction process) The CD-DA decoder 120B outputs the decoding-resultant signal to the CPU 114 and the CD-ROM decoder 122.

At a start of the playback mode of operation of the apparatus of FIG. 15, the CPU 117 informs the servo control circuit 106 of a desired initial position of the optical head 103 relative to the optical head 101. The servo control circuit 106 adjusts the focusing tracking servo section 105 in response to the positional information from the CPU 117, thereby setting the optical head 103 in a position equal to the desired initial position. In this case, the desired initial position corresponds to a starting end of an inner area of the optical disc 101. During the start of the recording mode of operation of the apparatus of FIG. 15, the servo control circuit 106 adjusts the focusing tracking servo section 105 to move the optical head 103 from the initial position to read out TOC information from the inner area of the optical disc 101. The CD-DA decoder 120B outputs reproduced TOC information to the CPU 114. The CPU 114 transfers the TOC information to the RAM within the CPU 117.

Generally, TOC information contains four control bits Q1, Q2, Q3, and Q4. Among them, the control bit Q2 is used as an indication of the type of a related optical disc 101. Specifically, the control bit Q2 being "0" indicates that the related optical disc 101 agrees with a CD-DA. The control bit Q2 being "1" indicates that the related optical disc 101 agrees with a CD-ROM or a CD-ROM-audio.

It should be noted that some of CD-ROM's are devoid of TOC information. Also, some of CD-ROM-audios are devoid of TOC information.

Figure 16:
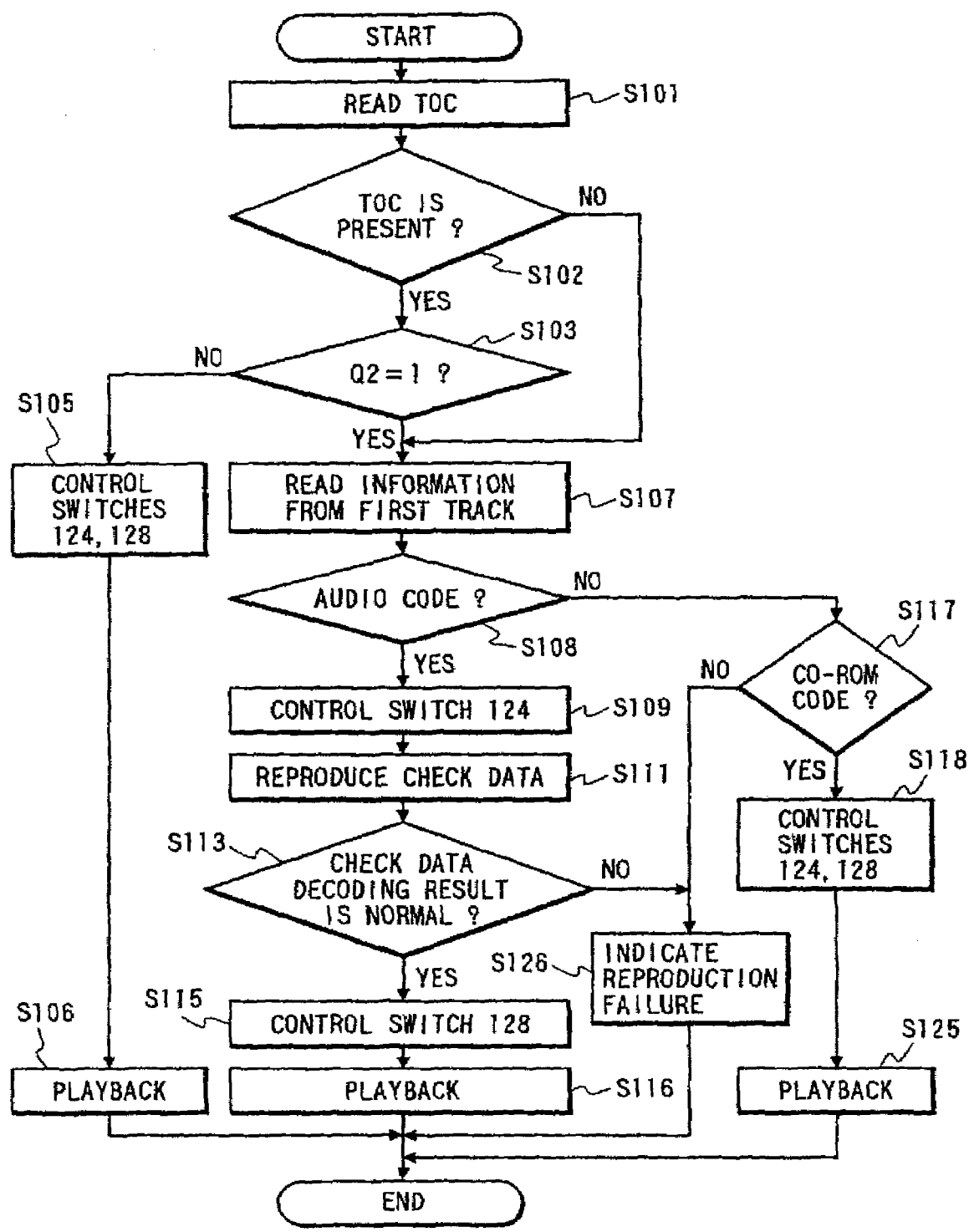
FIG. 16 is a flowchart of a segment of a program related to operation of a CPU in FIG. 15.

FIG. 16 is a flowchart of a segment of the program in the CPU 114. The program segment in FIG. 16 relates to the playback mode of operation of the apparatus of FIG. 15. As shown in FIG. 16, a first step S101 of the program segment reads out TOC information from the RAM within the CPU 117.

A step S102 following the step S101 decides whether or not the TOC information is present, that is, whether or not the TOC information has been successfully read out from the optical disc 101. When the TOC information is present, that is, when the TOC information has been successfully read out from the optical disc 101, the program advances from the step S102 to a step S103. Otherwise, the program advances from the step S102 to a step S107.

The step S103 decides whether or not the control bit Q2 in the TOC information is "1". When the control bit Q2 is "1", the program advances from the step S103 to the step S107. When the control bit Q2 is "0", the program advances from the step S103 to a step S105. In this case, it is decided that the optical disc 101 agrees with a CD-DA.

Data recorded on a CD-ROM or a CD-ROM-audio has a sync signal of a first type. Data recorded on a CD-DA has a sync signal of a second type different from the first type. The step S103 may decide whether or not a sync signal of the first type is present in reproduced data. In this case, when a sync signal of the first type is not present, it is decided that the optical disc 101 agrees with a CD-DA.

The step S105 controls the switches 124 and 128 so that the movable contact of the switch 124 will connect with the fixed contact "b" thereof while the movable contact of the switch 128 will connect with the fixed contact "d" thereof. In this case, the CD-DA decoder 120B is connected to the output circuit 112 while the CD-ROM decoder 122 and the orthogonal transform/Huffman decoder 126 are disconnected from the output circuit 112.

A step S106 following the step S105 controls the CPU 117 so that information will be reproduced from first and later tracks on the optical disc 101. In this case, the CD-DA decoder 120B outputs reproduced data to the output circuit 112. After the step S106, the current execution cycle of the program segment ends.

The step S107 controls the CPU 117 so that information will be reproduced from the first track on the optical disc 101. The step S107 receives reproduced data from the CD-DA decoder 120B which represents the first-track information.

When the optical disc 101 agrees with a CD-ROM-audio, the first-track information has CD-ROM-audio code words rather than CD-ROM code words. When the optical disc 101 agrees with a CD-ROM, the first-track information has CD-ROM code words rather than CD-ROM-audio code words.

A step S108 subsequent to the step S107 decides whether or not the first-track information has CD-ROM-audio code words.

When the first-track information has CD-ROM-audio code words, the program advances from the step S108 to a step S109. In this case, it is decided that the optical disc 101 agrees with a CD-ROM-audio. When the first-track information does not have any CD-ROM-audio code words, the program advances from the step S108 to a step S117.

The step S109 controls the switch 124 so that the movable contact of the switch 124 will connect with the fixed contact "a" thereof. In this case, the orthogonal transform/Huffman decoder 126 is connected to the CD-ROM decoder 122.

A step S111 following the step S109 controls the CPU 117 so that check data will be read out from a given track on the optical disc 101. In this case, the CD-DA decoder 120B outputs reproduced check data to the CD-ROM decoder 122. The CD-ROM decoder 122 subjects the reproduced check data to a CD-ROM decoding process including a de-interleaving process (an inverse interleaving process). The CD-ROM decoder 122 outputs the process-resultant data to the orthogonal transform/Huffman decoder 126. The orthogonal transform/Huffman decoder 126 subjects the output signal of the CD-ROM decoder 122 to inverse orthogonal transform and a Huffman decoding process. The orthogonal transform/ Huffman decoder 126 outputs the resultant data to the CPU 114 as decoding-resultant data corresponding to the reproduced check data. The step S111 receives the decoding-resultant data from the orthogonal transform/Huffman decoder 126 which corresponds to the reproduced check data.

A step S113 subsequent to the step S111 decides whether or not the decoding-resultant data corresponding to the reproduced check data is normal. When the decoding-resultant data is normal, the program advances from the step S113 to a step S115. Otherwise, the program advances from the step S113 to a step S126.

The step S115 controls the switch 128 so that the movable contact of the switch 128 will connect with the fixed contact "c" thereof. In this case, the orthogonal transform/Huffman decoder 126 is connected to the output circuit 112.

A step S116 following the step 115 controls the CPU 117 so that information will be reproduced from second and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the orthogonal transform/Huffman decoder 126. The orthogonal transform/Huffman decoder 126 subjects the output signal of the CD-ROM decoder 122 to the inverse orthogonal transform and the Huffman decoding process. The orthogonal transform/Huffman decoder 126 outputs the resultant data to the output circuit 112. After the step S116, the current execution cycle of the program segment ends.

The step S117 decides whether or not the first-track information has CD-ROM code words. When the first-track information has CD-ROM code words, the program advances from the step S117 to a step S118. In this case, it is decided that the optical disc 101 agrees with a CD-ROM. When the first-track information does not have any CD-ROM code words, the program advances from the step S117 to the step S126.

The step S118 controls the switches 124 and 128 so that the movable contact of the switch 124 will connect with the fixed contact "a" thereof while the movable contact of the switch 128 will connect with the fixed contact "d" thereof. In this case, the CD-ROM decoder 122 is connected to the output circuit 112 while the CD-DA decoder 120B and the orthogonal transform/Huffman decoder 126 are disconnected from the output circuit 112.

A step S125 following the step S118 controls the CPU 117 so that information will be reproduced from the first and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the output circuit 112. After the step S125, the current execution cycle of the program segment ends.

The step S126 controls the CPU 117 so that the CPU 117 will output a given display signal to the display unit 116. The given display signal is indicated by the display unit 116. The given display signal represents that information can not be normally reproduced from the optical disc 101. In other words, the given display signal represents a failure of the reproduction of information from the optical disc 101. After the step S126, the current execution cycle of the program segment ends.

It should be noted that the CD-ROM encoder 121 and the CD-ROM decoder 122 may be replaced by a DVD encoder (a DVD packing encoder) and a DVD decoder (a DVD unpacking decoder), respectively. In this case, the step S117 in FIG. 16 is modified to refer to MPEG code words rather than CD-ROM code words.

Sixth Embodiment

Figure 17:
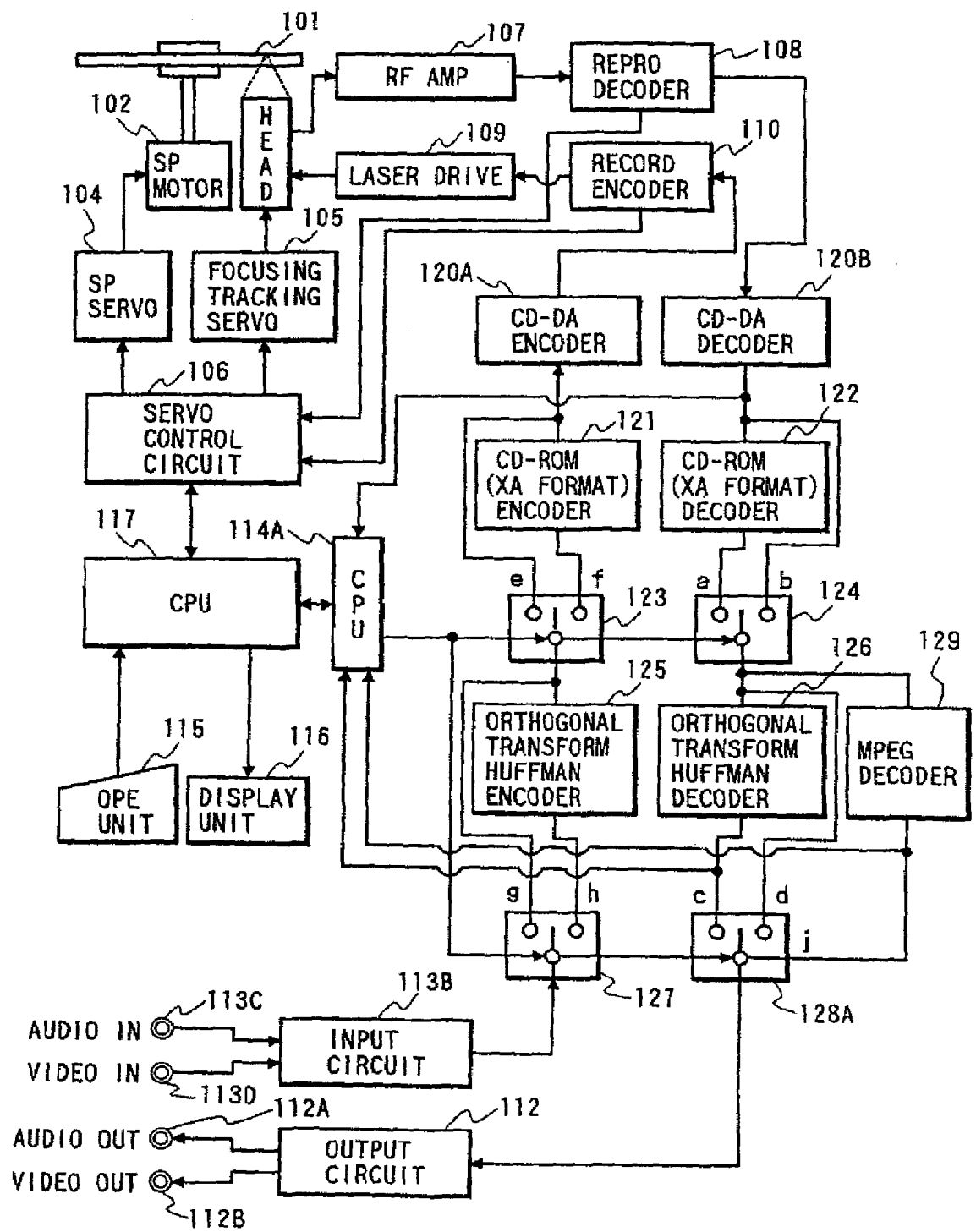
FIG. 17 is a block diagram of an apparatus for an optical disc according to a sixth embodiment of this invention.

FIG. 17 shows a sixth embodiment of this invention which is similar to the embodiment of FIG. 15 except for the following design changes. The embodiment of FIG. 17 includes a CPU 114A instead of the CPU 114 in FIG. 15. The embodiment of FIG. 17 includes a switch 128A instead of the switch 128 in FIG. 15. The embodiment of FIG. 17 includes an MPEG decoder 129. The embodiment of FIG. 17 includes an input circuit 113B instead of the input circuit 113 in FIG. 15. The embodiment of FIG. 17 is able to handle an optical disc 101 which can be selected from among various discs such as a CD-DA, a CD-ROM-audio, and a video-CD.

A first input side of the input circuit 113B is connected to an apparatus input terminal 113C. A second input side of the input circuit 113B is connected to an apparatus input terminal 113D. The output side of the input circuit 113B is connected to the movable contact of the switch 127.

During the recording mode of operation of the apparatus of FIG. 17 for a video-CD, an input analog audio signal is fed to the input circuit 113B via the apparatus input terminal 113C. In addition, an input analog video signal is fed to the input circuit 113B via the apparatus input terminal 113D. The input circuit 113B has a first A/D converter which changes the input analog audio signal into a corresponding digital audio signal. The input circuit 113B has a second A/D converter which changes the input analog video signal into a corresponding digital video signal. The input circuit 113B has a section which combines the digital audio signal and the digital video signal into a composite digital signal. The input circuit 113B outputs the composite digital signal to the movable contact of the switch 127. The CPU 114 controls the switches 123 and 127 so that the output signal of the input circuit 113B will bypass the orthogonal transform/Huffman encoder 125 and will travel to the CD-ROM encoder 121.

The switch 128A has a movable contact and fixed contacts "c", "d", and "j". The switch 128A has a control terminal. The switch 128A is changeable among four different states in response to a signal fed to the control terminal. When the switch 128A assumes a first state, the movable contact thereof connects with the fixed contact "c" thereof and disconnects from the fixed contact "d" and "j" thereof. When the switch 128A assumes a second state, the movable contact thereof connects with the fixed contact "d" thereof and disconnects from the fixed contacts "c" and "j" thereof. When the switch 128A assumes a third state, the movable contact thereof connects with the fixed contact "j" thereof and disconnects from the fixed contacts "c" and "d" thereof. When the switch 128A assumes a fourth state, the movable contact thereof connects with none of the fixed contacts "c", "d", and "j" thereof. The control terminal of the switch 128A is connected to the CPU 114A. The fixed contact "c" of the switch 128A leads from the output side of the orthogonal transform/Huffman decoder 126. The fixed contact "d" of the switch 128A leads from the movable contact of the switch 124. The fixed contact "j" of the switch 128A leads from the output side of the MPEG decoder 129. The movable contact of the switch 128A leads to the input side of the output circuit 112. The input side of the MPEG decoder 129 leads from the movable contact of the switch 124. The output side of the MPEG decoder 129 is connected to the CPU 11A.

Figure 18:
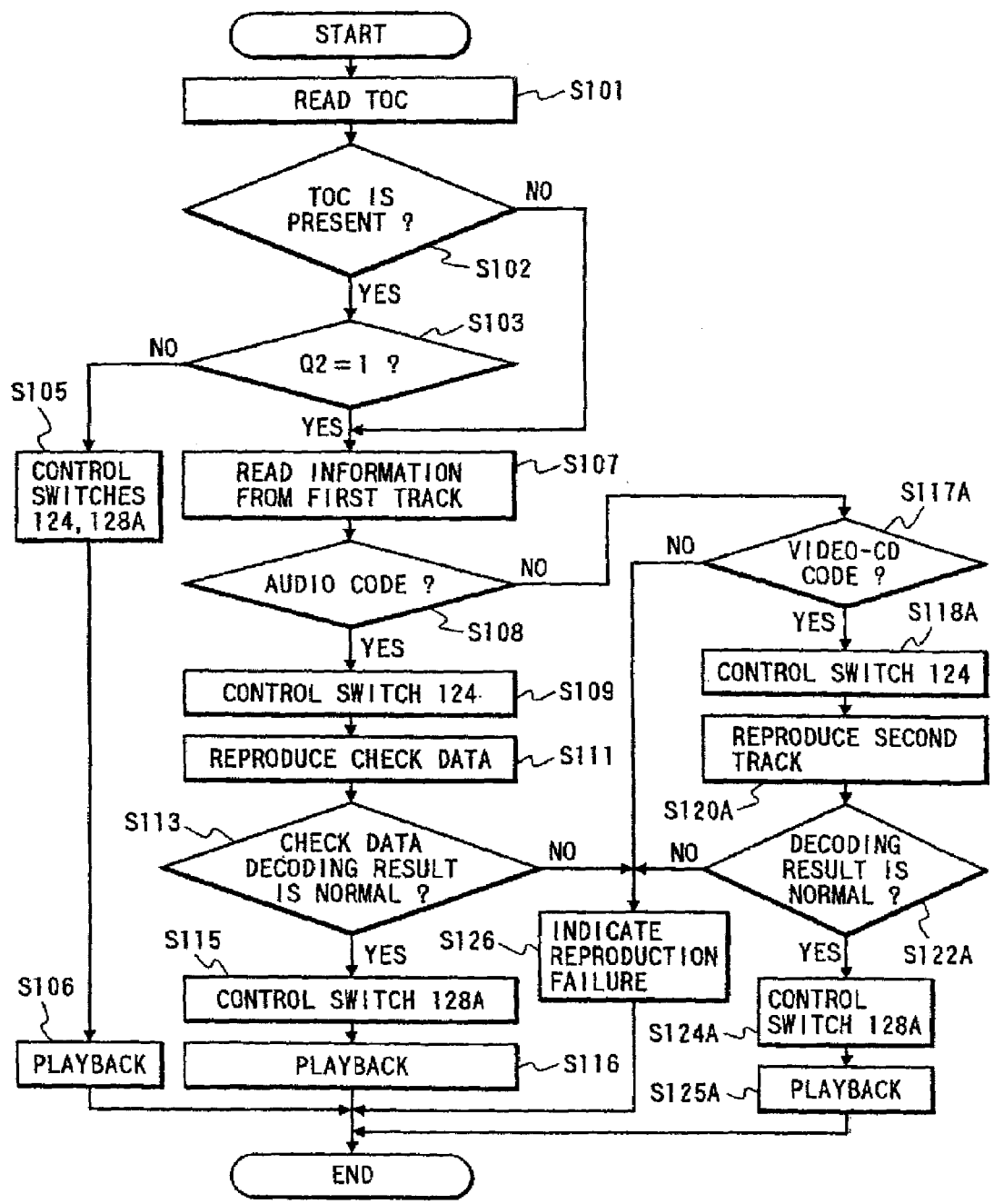
FIG. 18 is a flowchart of a segment of a program related to operation of a CPU in FIG. 17.

FIG. 18 is a flowchart of a segment of a program in the CPU 114A. The program segment in FIG. 18 is similar to the program segment in FIG. 16 except for the following design changes. With reference to FIG. 18, a step S117A which replaces the step S117 in FIG. 16 decides whether or not the first-track information has video-CD code words. When the first-track information has video-CD code words, the program advances from the step S117A to a step S118A. In this case, it is decided that the optical disc 101 agrees with a video-CD. When the first-track information does not have any video-CD code words, the program advances from the step S117A to the step S126.

The step S118A controls the switch 124 so that the movable contact of the switch 124 will connect with the fixed contact "a" thereof. In this case, the MPEG decoder 129 is connected to the CD-ROM decoder 122.

A step S120A following the step S118A controls the CPU 117 so that information will be read out from a second track on the optical disc 101. In this case, the CD-DA decoder 120B outputs reproduced data to the CD-ROM decoder 122 which corresponds to the second-track information. The CD-ROM decoder 122 subjects the reproduced data to the CD-ROM decoding process including the de-interleaving process. The CD-ROM decoder 122 outputs the process-resultant data to the MPEG decoder 129. The MPEG decoder 129 subjects the output signal of the CD-ROM decoder 122 to an MPEG decoding process. The MPEG decoder 129 outputs the decoding-resultant data to the CPU 114A which corresponds to the second-track information. The step S120A receives the decoding-resultant data from the MPEG decoder 129 which corresponds to the second-track information.

A step S122A subsequent to the step S120A decides whether or not the decoding-resultant data corresponding to the second-track information is normal. When the decoding-resultant data is normal, the program advances from the step S122A to a step S124A. Otherwise, the program advances from the step S122 to the step S126.

The step S124A controls the switch 128A so that the movable contact of the switch 128A will connect with the fixed contact "j" thereof. In this case, the MPEG decoder 129 is connected to the output circuit 112.

A step S125A following the step S124A controls the CPU 117 so that information will be reproduced from second and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the MPEG decoder 129. The MPEG decoder 129 subjects the output signal of the CD-ROM decoder 122 to the MPEG decoding process. The MPEG decoder 129 outputs the decoding-resultant data to the output circuit 112. After the step S125A, the current execution cycle of the program segment ends.

It should be noted that the CD-ROM encoder 121 and the CD-ROM decoder 122 may be replaced by a DVD encoder (a DVD packing encoder) and a DVD decoder (a DVD unpacking decoder), respectively. In this case, the step S117A in FIG. 18 is modified to refer to MPEG code words rather than video-CD code words.

Seventh Embodiment

Figure 19:
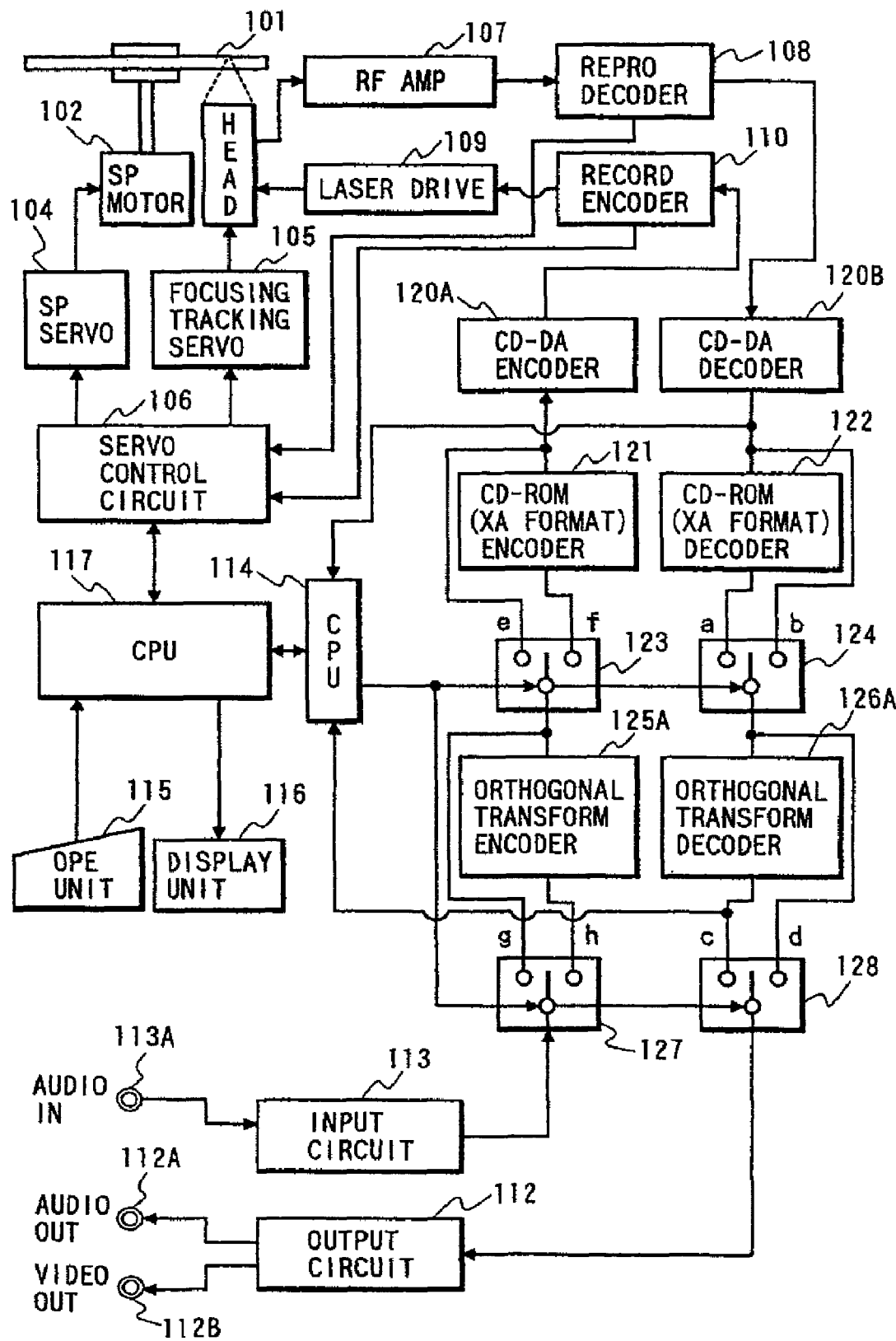
FIG. 19 is a block diagram of an apparatus for an optical disc according to a seventh embodiment of this invention.

FIG. 19 shows a seventh embodiment of this invention which is similar to the embodiment of FIG. 15 except for the following design changes. The embodiment of FIG. 19 includes an orthogonal transform encoder 125A instead of the orthogonal transform/Huffman encoder 125 in FIG. 15. The embodiment of FIG. 19 includes an orthogonal transform decoder 126A instead of the orthogonal transform/Huffman decoder 126 in FIG. 15.

The orthogonal transform encoder 125A implements only orthogonal transform on received data. The orthogonal transform decoder 126A implements only inverse orthogonal transform on received data.

It should be noted that the CD-ROM encoder 121 and the CD-ROM decoder 122 may be replaced by a DVD encoder (a DVD packing encoder) and a DVD decoder (a DVD unpacking decoder), respectively.

Eighth Embodiment

Figure 20:
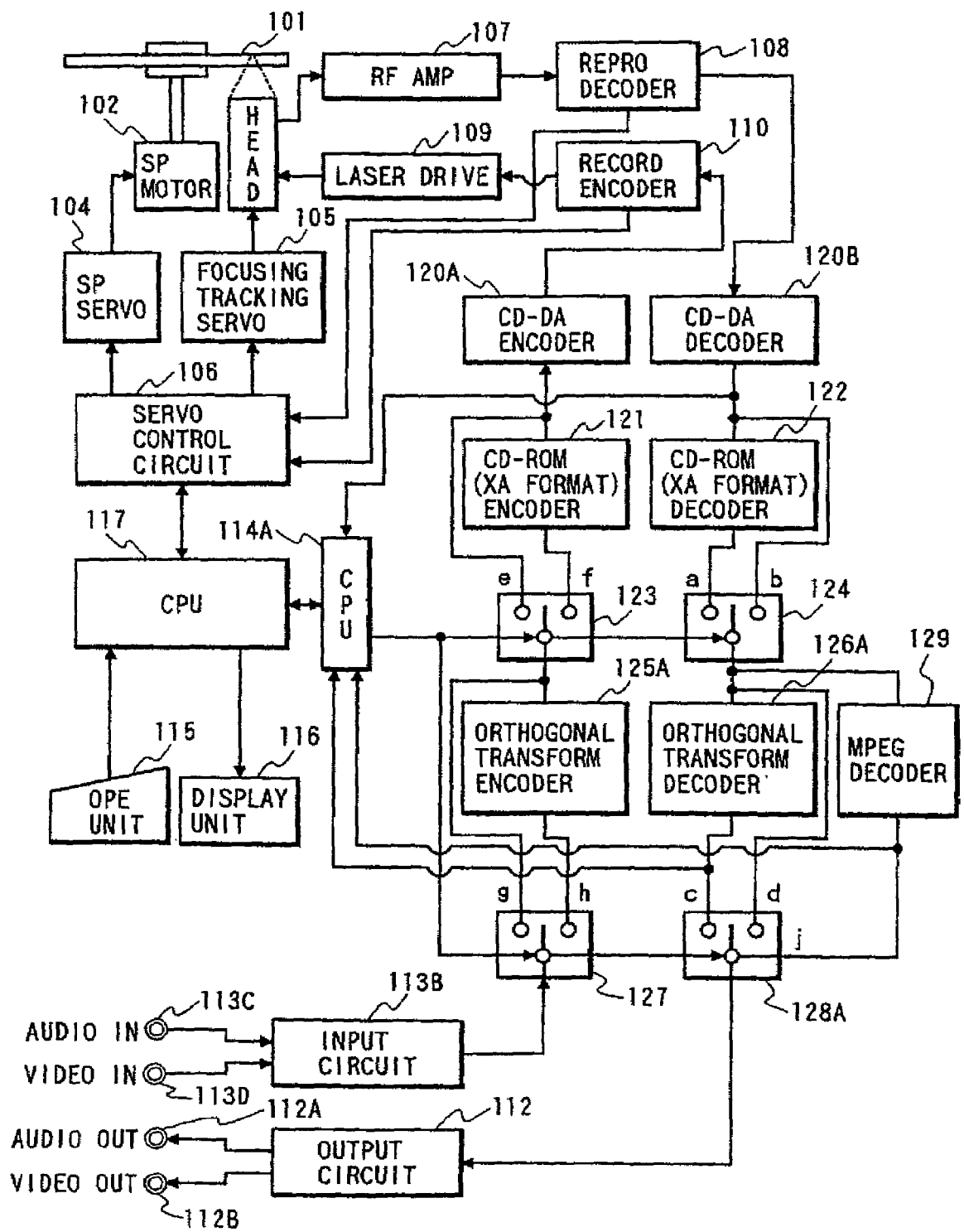
FIG. 20 is a block diagram of an apparatus for an optical disc according to an eighth embodiment of this invention.

FIG. 20 shows an eighth embodiment of this invention which is similar to the embodiment of FIG. 17 except for the following design changes. The embodiment of FIG. 20 includes an orthogonal transform encoder 125A instead of the orthogonal transform/Huffman encoder 125 in FIG. 17. The embodiment of FIG. 20 includes an orthogonal transform decoder 126A instead of the orthogonal transform/Huffman decoder 126 in FIG. 17.

The orthogonal transform encoder 125A implements only orthogonal transform on received data. The orthogonal transform decoder 126A implements only inverse orthogonal transform on received data.

It should be noted that the CD-ROM encoder 121 and the CD-ROM decoder 122 may be replaced by a DVD encoder (a DVD packing encoder) and a DVD decoder (a DVD unpacking decoder), respectively.

Ninth Embodiment

Figure 21:
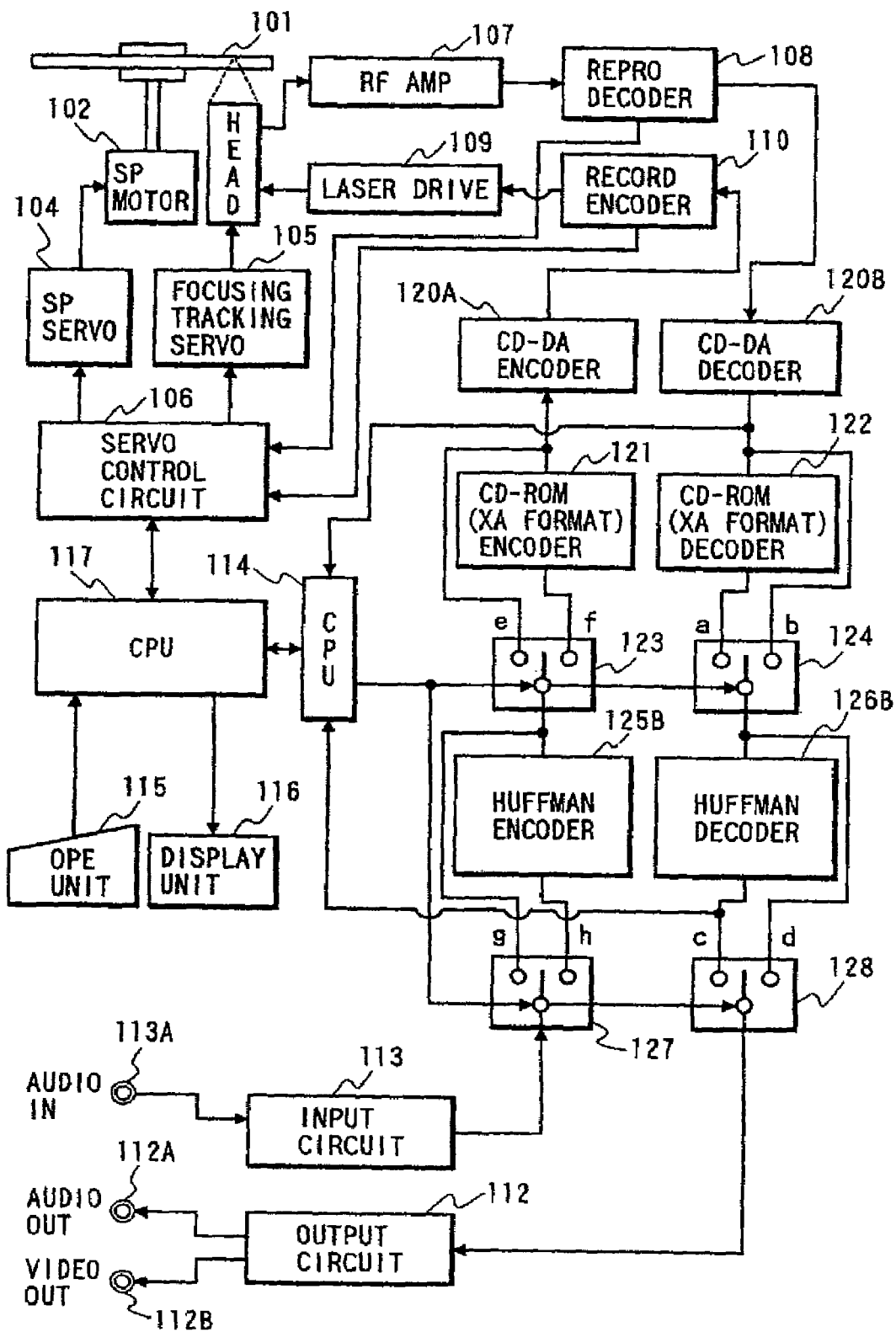
FIG. 21 is a block diagram of an apparatus for an optical disc according to a ninth embodiment of this invention.

FIG. 21 shows a ninth embodiment of this invention which is similar to the embodiment of FIG. 15 except for the following design changes. The embodiment of FIG. 21 includes a Huffman encoder 125B instead of the orthogonal transform/Huffman encoder 125 in FIG. 15. The embodiment of FIG. 21 includes a Huffman decoder 126B instead of the orthogonal transform/Huffman decoder 126 in FIG. 15.

The Huffman encoder 125B implements only a Huffman encoding process on received data. The Huffman decoder 126B implements only a Huffman decoding process on received data.

It should be noted that the CD-ROM encoder 121 and the CD-ROM decoder 122 may be replaced by a DVD encoder (a DVD packing encoder) and a DVD decoder (a DVD unpacking decoder), respectively.

Tenth Embodiment

Figure 22:
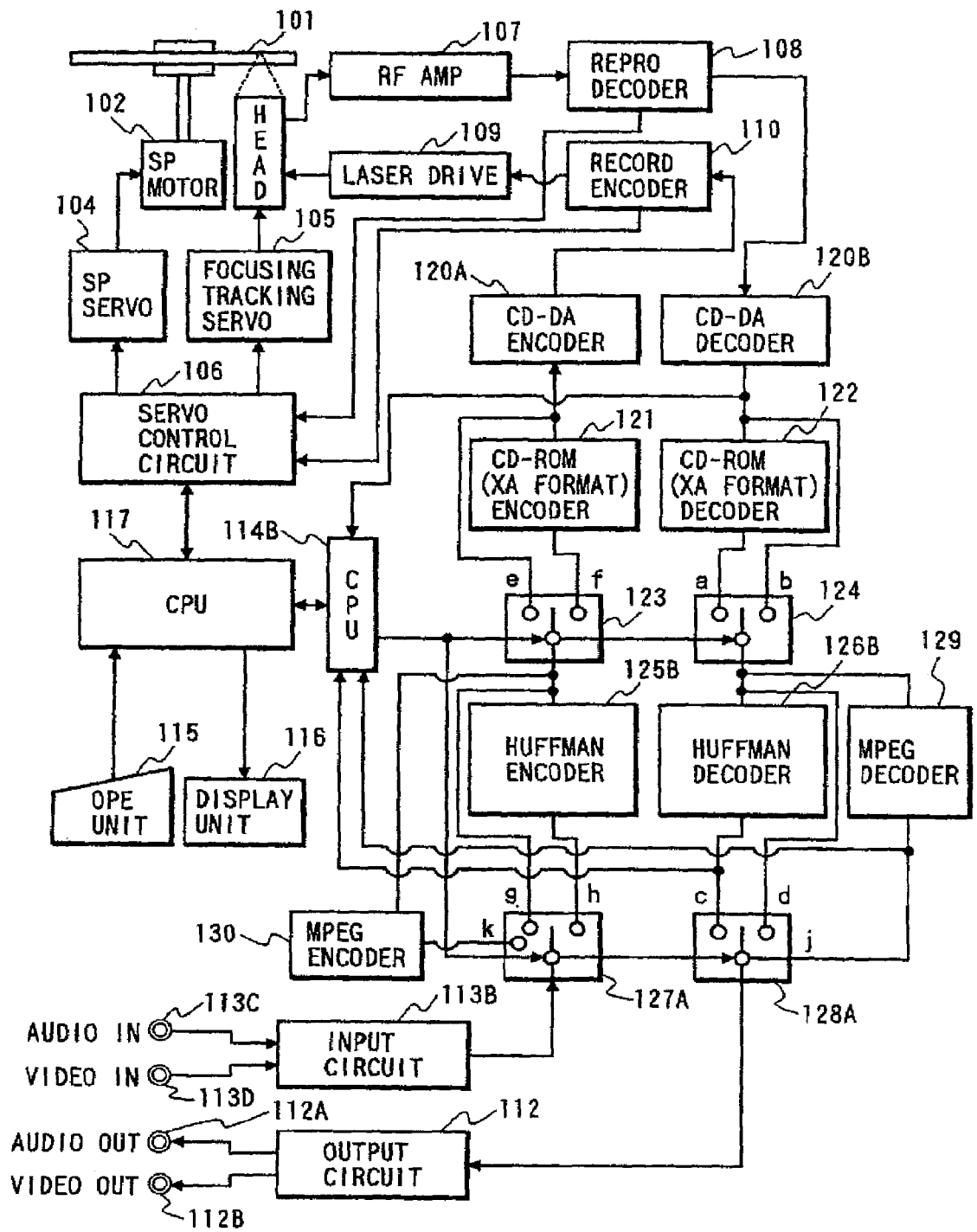
FIG. 22 is a block diagram of an apparatus for an optical disc according to a tenth embodiment of this invention.

FIG. 22 shows a tenth embodiment of this invention which is similar to the embodiment of FIG. 17 except for the following design changes. The embodiment of FIG. 22 includes a Huffman encoder 125B instead of the orthogonal transform/Huffman encoder 125 in FIG. 17. The embodiment of FIG. 22 includes a Huffman decoder 126B instead of the orthogonal transform/Huffman decoder 126 in FIG. 17.

The Huffman encoder 125B implements only a Huffman encoding process on received data. The Huffman decoder 126B implements only a Huffman decoding process on received data.

The embodiment of FIG. 22 includes a switch 127A instead of the switch 127 in FIG. 17. The embodiment of FIG. 22 includes a CPU 114B instead of the CPU 114A in FIG. 17. The embodiment of FIG. 22 includes an MPEG decoder 130.

The switch 127A has a movable contact and fixed contacts "g", "h", and "k". The switch 127A has a control terminal. The switch 127A is changeable among four different states in response to a signal fed to the control terminal. When the switch 127A assumes a first state, the movable contact thereof connects with the fixed contact "g" thereof and disconnects from the fixed contacts "h" and "k" thereof. When the switch 127A assumes a second state, the movable contact thereof connects with the fixed contact "h" thereof and disconnects from the fixed contacts "g" and "h" thereof. When the switch 127A assumes a third state, the movable contact thereof connects with the fixed contact "k" thereof and disconnects from the fixed contacts "g" and "h" thereof. When the switch 127A assumes a fourth state, the movable contact thereof connects with none of the fixed contacts "g", "h", and "k" thereof. The control terminal of the switch 127A is connected to the CPU 114B. The fixed contact "g" of the switch 127A leads to the movable contact of the switch 123. The fixed contact "h" of the switch 127A leads to the input side of the Huffman encoder 125B. The fixed contact "k" of the switch 127A leads to the input side of the MPEG encoder 130. The movable contact of the switch 127A leads from the output side of the input circuit 113B. The output side of the MPEG encoder 130 is connected to the movable contact of the switch 123.

It is assumed that the user designates the recording mode of operation of the apparatus of FIG. 22 by actuating the operation unit 115. In this case, the user also designates the format by actuating the operation unit 115. Generally, the designated format corresponds to the standards of an optical disc 101 set in the normal position within the apparatus of FIG. 22. The operation unit 115 informs the CPU 117 that the recording mode of operation is currently designated. Also, the operation unit 115 informs the CPU 117 of the currently designated format. The CPU 117 transfers the information of the currently designated operation mode and the currently designated format to the CPU 114B. When the currently designated format agrees with the video-CD format, the CPU 114B controls the switches 123 and 127A so that the movable contact of the switch 123 connects with the fixed contact "f" thereof and the movable contact of the switch 127A connects with the fixed contact "k" thereof. Therefore, the MPEG encoder 130 is connected to the input circuit 113B while the Huffman encoder 125B is disconnected from the input circuit 113B. In this case, the digital signal is transmitted from the input circuit 113B to the MPEG encoder 130. The MPEG encoder 130 subjects the digital signal to an MPEG encoding process to compress the digital signal. The MPEG encoder 130 outputs the resultant digital signal to the CD-ROM encoder 121. The CD-ROM encoder 121 subjects the output signal of the MPEG encoder 130 to the CD-ROM encoding process including the interleaving process. The CD-ROM encoder 121 outputs the process-resultant digital signal to the CD-DA encoder 120A. The CD-DA encoder 120A subjects the output signal of the CD-ROM encoder 121 to the CIRC encoding process. The CD-DA encoder 120A outputs the encoding-resultant digital signal to the recording encoder 110 as recorded data (data to be recorded) of the video-CD format.

The recording encoder 110 subjects the recorded data of the video-CD format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the video-CD format is recorded on the optical disc 101. Furthermore, TOC information related to the recorded data is generated, and the TOC information is recorded on the inner area of the optical disc 101.

It should be noted that the CD-ROM encoder 121 and the CD-ROM decoder 122 may be replaced by a DVD encoder (a DVD packing encoder) and a DVD decoder (a DVD unpacking decoder), respectively.

Eleventh Embodiment

Figure 23:
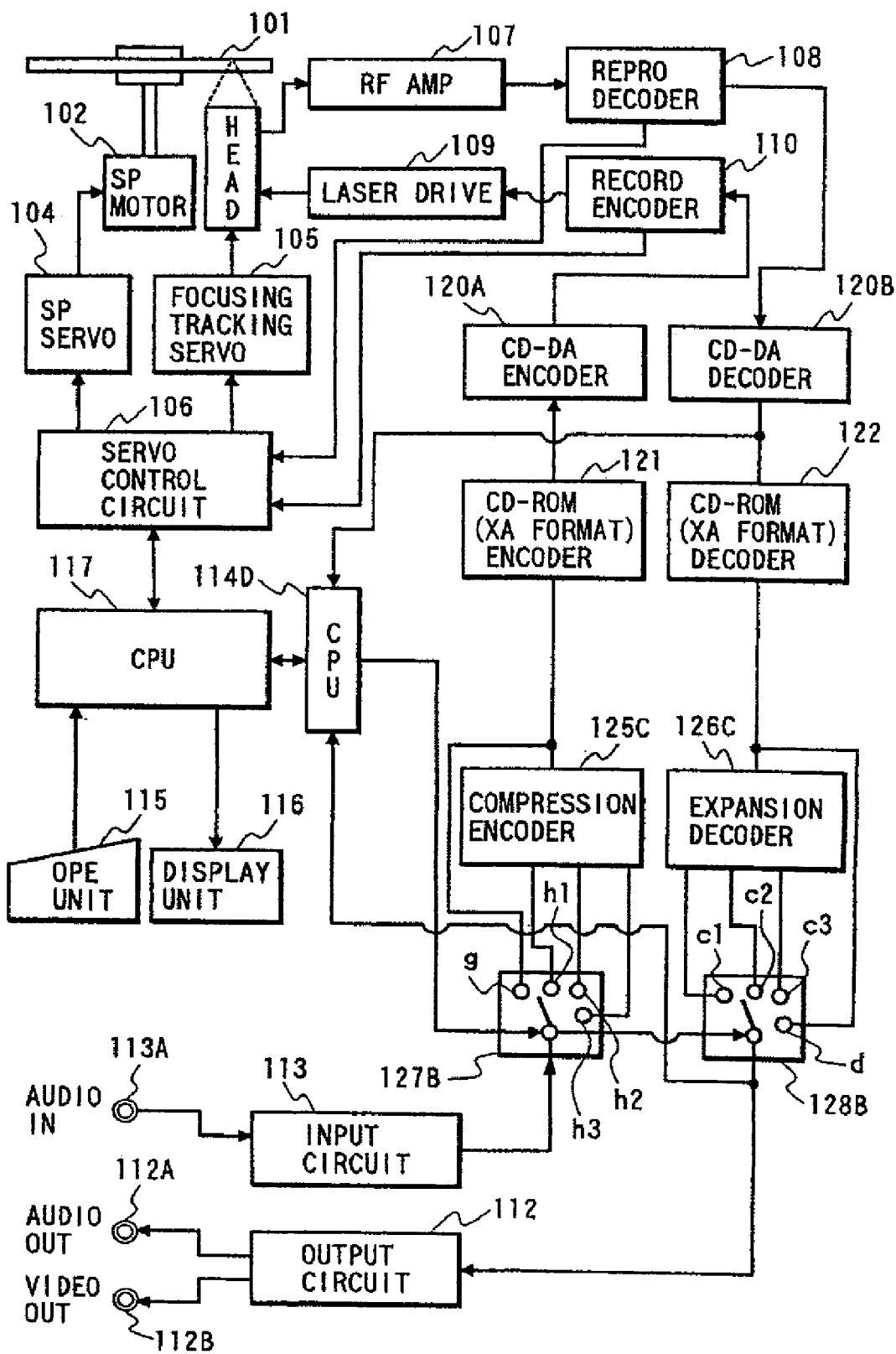
FIG. 23 is a block diagram of an apparatus for an optical disc according to an eleventh embodiment of this invention.

FIG. 23 shows an eleventh embodiment of this invention which is similar to the embodiment of FIG. 15 except for the following design changes. The embodiment of FIG. 23 includes a CPU 114D instead of the CPU 114 in FIG. 15. The CPU 114D is connected to the CD-DA encoder 120A. The embodiment of FIG. 23 includes a compression encoder 125C, an expansion decoder 126C, and switches 127B and 128B. The embodiment of FIG. 23 is able to handle an optical disc 101 which can be selected from among various discs such as a CD-DA and a CD-ROM-audio.

The switch 127B has a movable contact and fixed contacts "g", "h1", "h2", and "h3". The switch 127B has a control terminal. The switch 127B is changeable among five different states in response to a signal fed to the control terminal. When the switch 127B assumes a first state, the movable contact thereof connects with the fixed contact "g" thereof and disconnects from the fixed contacts "h1", "h2", and "h3" thereof. When the switch 127B assumes a second state, the movable contact thereof connects with the fixed contact "h1" thereof and disconnects from the fixed contacts "g", "h2", and "h3" thereof. When the switch 127B assumes a third state, the movable contact thereof connects with the fixed contact "h2" thereof and disconnects from the fixed contacts "g", "h1", and "h3" thereof. When the switch 127B assumes a fourth state, the movable contact thereof connects with the fixed contact "h3" thereof and disconnects from the fixed contacts "g", "h1", and "h2" thereof. When the switch 127B assumes a fifth state, the movable contact thereof connects with none of the fixed contacts "g", "h1", "h2", and "h3" thereof. The control terminal of the switch 127B is connected to the CPU 114D. The fixed contact "g" of the switch 127B leads to the input side of the CD-ROM encoder 121. The fixed contact "h1" of the switch 127B leads to a first input side of the compression encoder 125C. The fixed contact "h2" of the switch 127B leads to a second input side of the compression encoder 125C. The fixed contact "h3" of the switch 127B leads to a third input side of the compression encoder 125C. The movable contact of the switch 127B leads from the output side of the input circuit 113. The output side of the compression encoder 125C is connected to the input side of the CD-ROM encoder 121.

The switch 128B has a movable contact and fixed contacts "c1", "c2", "c3", and "d". The switch 128B has a control terminal. The switch 128B is changeable among five different states in response to a signal fed to the control terminal. When the switch 128B assumes a first state, the movable contact thereof connects with the fixed contact "c1" thereof and disconnects from the fixed contact "c2", "c3", and "d" thereof when the switch 128B assumes a second state, the movable contact thereof connects with the fixed contact "c2" thereof and disconnects from the fixed contacts "c1", "c3", and "d" thereof. When the switch 128B assumes a third state, the movable contact thereof connects with the fixed contact "c3" thereof and disconnects from the fixed contacts "c1", "c2", and "d" thereof. When the switch 128B assumes a fourth state, the movable contact thereof connects with the fixed contact "d" thereof and disconnects from the fixed contacts "c1", "c2", and "c3" thereof. When the switch 128B assumes a fifth state, the movable contact thereof connects with none of the fixed contacts "c1", "c2", "c3", and "d" thereof. The control terminal of the switch 128B is connected to the CPU 114D. The fixed contact "c1" of the switch 128B leads from a first output side of the expansion decoder 126C. The fixed contact "c2" of the switch 128B leads from a second output side of the expansion decoder 126C. The fixed contact "c3" of the switch 128B leads from a third output side of the expansion decoder 126C. The fixed contact "d" of the switch 128B leads from the output side of the CD-ROM decoder 122. The movable contact of the switch 128B leads to the input side of the output circuit 112. In addition, the movable contact of the switch 128B is connected to the CPU 114D. The input side of the compression decoder 126C is connected to the output side of the CD-ROM decoder 122.

Figure 24:
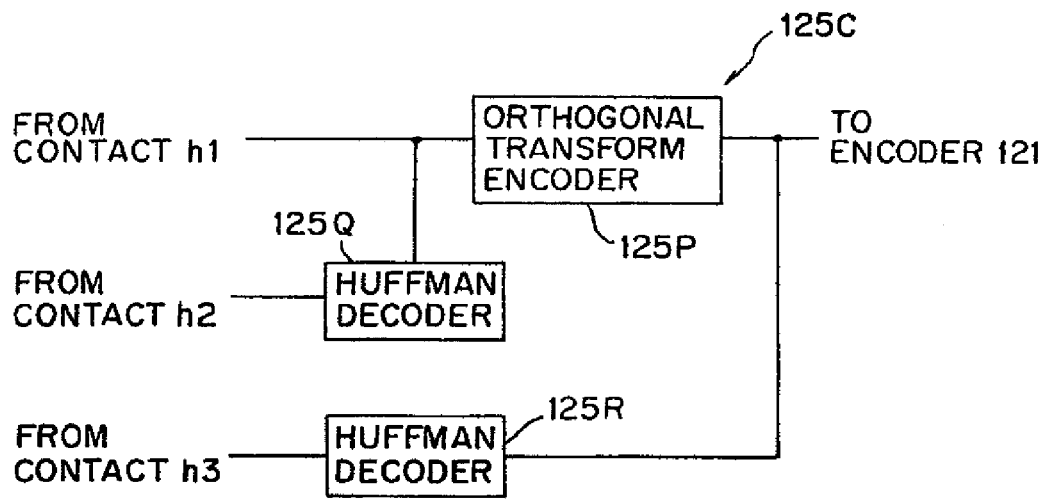
FIG. 24 is a block diagram of a compression encoder in FIG. 23.

As shown in FIG. 24, the compression encoder 125C includes an orthogonal transform encoder 125P, and Huffman encoders 125Q and 125R. The input side of the orthogonal transform encoder 125P is connected to the fixed contact "h1" of the switch 127B. The output side of the orthogonal transform encoder 125P is connected to the input side of the CD-ROM encoder 121. The input side of the Huffman encoder 125Q is connected to the fixed contact "h2" of the switch 127B. The output side of the Huffman encoder 125Q is connected to the input side of the orthogonal transform encoder 125P. The input side of the Huffman encoder 125R is connected to the fixed contact "h3" of the switch 127B. The output side of the Huffman encoder 125R is connected to the input side of the CD-ROM encoder 121.

Figure 25:
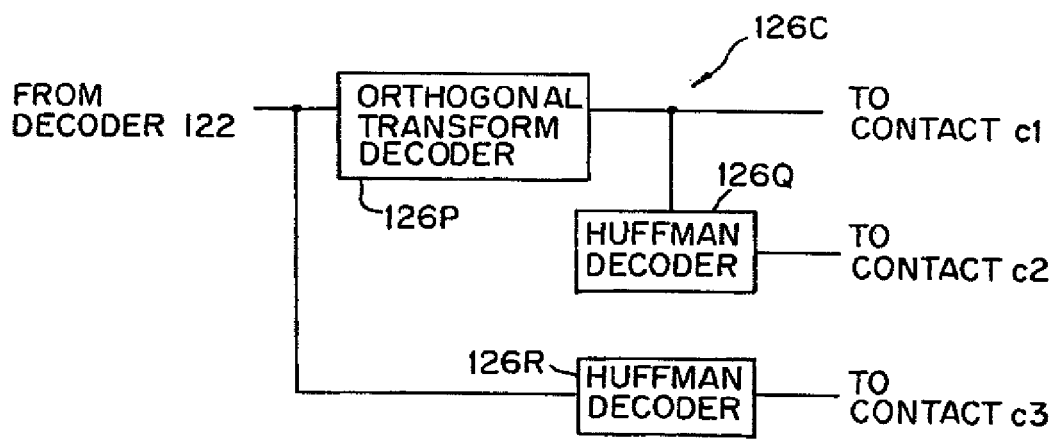
FIG. 25 is a block diagram of an expansion decoder in FIG. 23.

As shown in FIG. 25, the expansion decoder 126C includes an orthogonal transform decoder 126P, and Huffman decoders 126Q and 126R. The input side of the orthogonal transform decoder 126P is connected to the output side of the CD-ROM decoder 122. The output side of the orthogonal transform decoder 126P is connected to the fixed contact "c1" of the switch 128B. The input side of the Huffman decoder 126Q is connected to the output side of the orthogonal transform decoder 126P. The output side of the Huffman decoder 126Q is connected to the fixed contact "c2" of the switch 128B. The input side of the Huffman decoder 126R is connected to the output side of the CD-ROM decoder 122. The output side of the Huffman decoder 126R is connected to the fixed contact "c3" of the switch 128B.

The button in the operation unit 115 can also be used in selecting and designating one out of three different signal processing types, that is, first, second, and third processing types.

It is assumed that the user designates the recording mode of operation of the apparatus of FIG. 23 by actuating the operation unit 115. In this case, the user also designates the format and the processing type by actuating the operation unit 115. Generally, the designated format corresponds to the standards of an optical disc 101 set in the normal position within the apparatus of FIG. 23. The operation unit 115 informs the CPU 117 that the recording mode of operation is currently designated. Also, the operation unit 115 informs the CPU 117 of the currently designated format and the currently designated processing type. The CPU 117 transfers the information of the currently designated operation mode, the currently designated format, and the currently designated processing type to the CPU 114D. When the currently designated format agrees with the CD-ROM format, the CPU 114D controls the switch 127B so that the movable contact of the switch 127B connects with the fixed contact "g" thereof. Therefore, the CD-ROM encoder 121 is connected to the input circuit 113 while the compression encoder 125C is disconnected from the input circuit 113. In this case, the output signal of the input circuit 113 travels the CD-ROM encoder 121 while bypassing the compression encoder 125C. The CD-ROM encoder 121 subjects the output signal of the input circuit 113 to the CD-ROM encoding process including the interleaving process. The CD-ROM encoder 121 outputs the process-resultant digital signal to the CD-DA encoder 120A. The CD-DA encoder 120A subjects the output signal of the CD-ROM encoder 121 to the CIRC encoding process. The CD-DA encoder 120A outputs the encoding-resultant digital signal to the recording encoder 110 as recorded data (data to be recorded) of the CD-ROM format. The recording encoder 110 subjects the recorded data of the CD-ROM format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM format is recorded on the optical disc 101. Furthermore, TOC information related to the recorded data is generated, and the TOC information is recorded on the inner area of the optical disc 101.

A consideration will be given of the case where the user designates the recording mode of operation of the apparatus of FIG. 23 and also designates the format and the processing type. When the designated format agrees with the CD-ROM-audio format and the designated processing type agrees with the first processing type, the CPU 114D controls the switch 127B so that the movable contact of the switch 127B connects with the fixed contact "h1" thereof. Therefore, the output signal of the input circuit 113 travels the compression encoder 125C via the fixed contact "h1" of the switch 127B. In this case, the orthogonal transform encoder 125P in the compression encoder 125C subjects the output signal of the input circuit 113 to a data-compression encoding process using orthogonal transform. The orthogonal transform encoder 125P in the compression encoder 125C outputs the resultant signal to the CD-ROM encoder 121. The CD-ROM encoder 121 subjects the output signal of the compression encoder 125C to the CD-ROM encoding process including the interleaving process. The CD-ROM encoder 121 outputs the process-resultant digital signal to the CD-DA encoder 120A. The CD-DA encoder 120A subjects the output signal of the CD-ROM encoder 121 to the CIRC encoding process. The CD-DA encoder 120A outputs the encoding-resultant digital signal to the recording encoder 110 as recorded data (data to be recorded) of the CD-ROM-audio format. The recording encoder 110' subjects the recorded data of the CD-ROM-audio format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM-audio format is recorded on the optical disc 101. Furthermore, TOC information related to the recorded data is generated, and the TOC information is recorded on the inner area of the optical disc 101. The CPU 114D controls the CD-DA encoder 120A so that an information piece representing the use of the first processing type will be added to the TOC information.

A further consideration will be given of the case where the user designates the recording mode of operation of the apparatus of FIG. 23 and also designates the format and the processing type. When the designated format agrees with the CD-ROM-audio format and the designated processing type agrees with the second processing type, the CPU 114D controls the switch 127B so that the movable contact of the switch 127B connects with the fixed contact "h2" thereof. Therefore, the output signal of the input circuit 113 travels the compression encoder 125C via the fixed contact "h2" of the switch 127B. In this case, the Huffman encoder 125Q in the compression encoder 125C subjects the output signal of the input circuit 113 to a Huffman encoding process. The Huffman encoder 125Q outputs the resultant signal to the orthogonal transform encoder 125P in the compression encoder 125C. The orthogonal transform encoder 125P subjects the output signal of the Huffman encoder 125Q to the data-compression encoding process using the orthogonal transform. The orthogonal transform encoder 125P in the compression encoder 125C outputs the resultant signal to the CD-ROM encoder 121. The CD-ROM encoder 121 subjects the output signal of the compression encoder 125C to the CD-ROM encoding process including the interleaving process. The CD-ROM encoder 121 outputs the process-resultant digital signal to the CD-DA encoder 120A. The CD-DA encoder 120A subjects the output signal of the CD-ROM encoder 121 to the CIRC encoding process. The CD-DA encoder 120A outputs the encoding-resultant digital signal to the recording encoder 110 as recorded data (data to be recorded) of the CD-ROM-audio format. The recording encoder 110 subjects the recorded data of the CD-ROM-audio format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM-audio format is recorded on the optical disc 101. Furthermore, TOC information related to the recorded data is generated, and the TOC information is recorded on the inner area of the optical disc 101. The CPU 114D controls the CD-DA encoder 120A so that an information piece representing the use of the second processing type will be added to the TOC information.

A still further consideration will be given of the case where the user designates the recording mode of operation of the apparatus of FIG. 23 and also designates the format and the processing type. When the designated format agrees with the CD-ROM-audio format and the designated processing type agrees with the third processing type, the CPU 114D controls the switch 127B so that the movable contact of the switch 127B connects with the fixed contact "h3" thereof. Therefore, the output signal of the input circuit 113 travels the compression encoder 125C via the fixed contact "h3" of the switch 127B. In this case, the Huffman encoder 125R in the compression encoder 125C subjects the output signal of the input circuit 113 to a Huffman encoding process. The Huffman encoder 125R in the compression encoder 125C outputs the resultant signal to the CD-ROM encoder 121. The CD-ROM encoder 121 subjects the output signal of the compression encoder 125C to the CD-ROM encoding process including the interleaving process. The CD-ROM, encoder 121 outputs the process-resultant digital signal to the CD-DA encoder 120A. The CD-DA encoder 120A subjects the output signal of the CD-ROM encoder 121 to the CIRC encoding process. The CD-DA encoder 120A outputs the encoding-resultant digital signal to the recording encoder 110 as recorded data (data to be recorded) of the CD-ROM-audio format. The recording encoder 110 subjects the recorded data of the CD-ROM-audio format to the EFM modulation. The recording encoder 110 outputs the modulation-resultant signal to the laser drive section 109. The optical head 103 applies the laser light beam to the optical disc 101. The laser drive section 109 controls the power or the intensity of the laser light beam in response to the output signal of the recording encoder 110 so that information corresponding to the recorded data of the CD-ROM-audio format is recorded on the optical disc 101. Furthermore, TOC information related to the recorded data is generated, and the TOC information is recorded on the inner area of the optical disc 101. The CPU 114D controls the CD-DA encoder 120A so that an information piece representing the use of the third processing type will be added to the TOC information.

Figure 26:
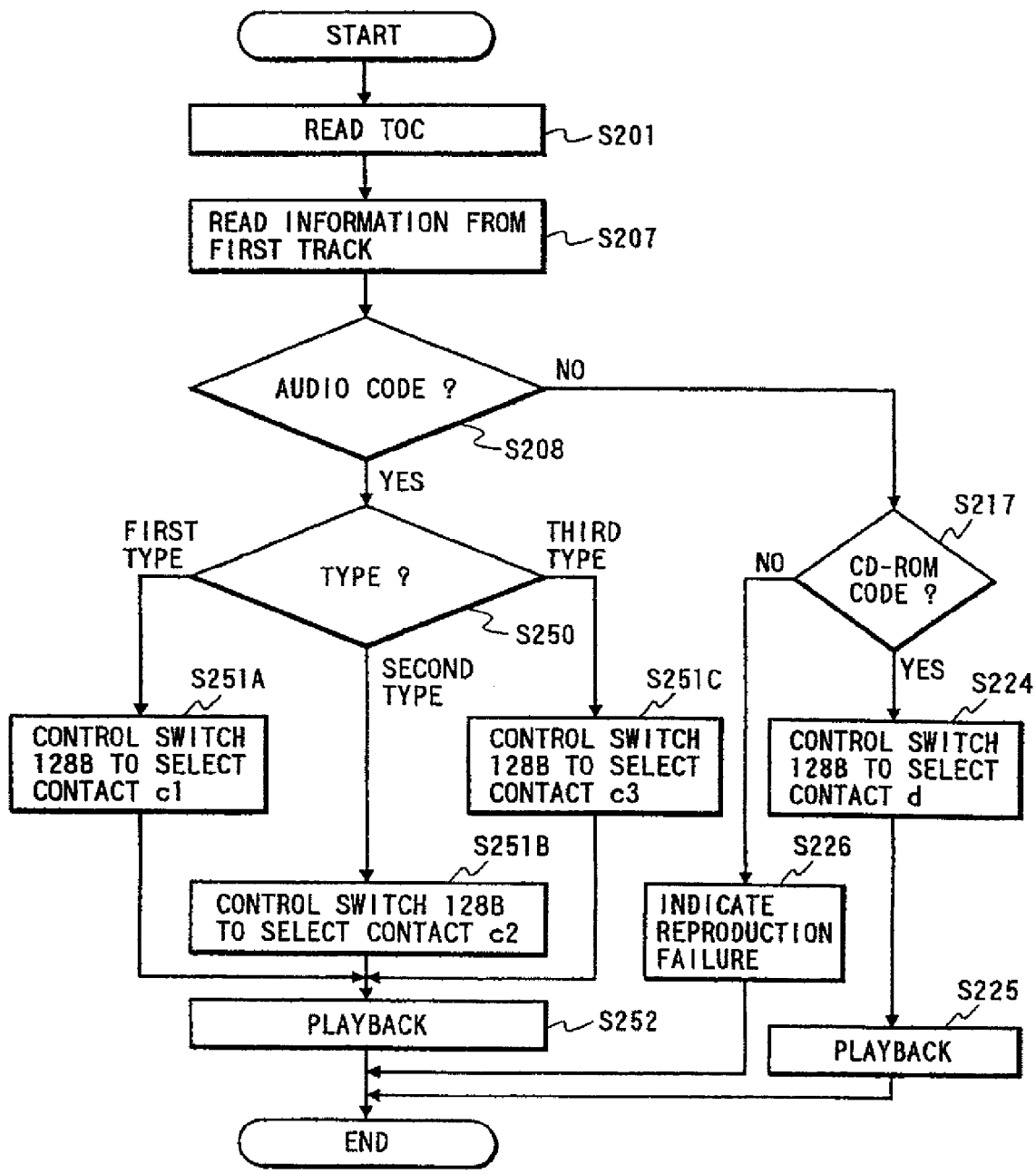
FIG. 26 is a flowchart of a segment of a program related to operation of a CPU in FIG. 23.

FIG. 26 is a flowchart of a segment of a program in the CPU 114D. The program segment in FIG. 26 relates to the playback mode of operation of the apparatus of FIG. 23. As shown in FIG. 26, a first step S201 of the program segment reads out TOC information from the RAM within the CPU 117.

A step S207 following the step S201 controls the CPU 117 so that information will be reproduced from the first track on the optical disc 101. The step S207 receives reproduced data from the CD-DA decoder 120B which represents the first-track information.

A step S208 subsequent to the step S207 decides whether or not the first-track information has CD-ROM-audio code words.

When the first-track information has CD-ROM-audio code words, the program advances from the step S208 to a step S250. In this case, it is decided that the optical disc 101 agrees with a CD-ROM-audio. When the first-track information does not have any CD-ROM-audio code words, the program advances from the step S208 to a step S217.

The step S250 decides which of the first, second, and third processing types is used by referring to the TOC information. When the first processing type is used, the program advances from the step S250 to a step S251A. When the second processing type is used, the program advances from the step S250 to a step S251B. When the third processing type is used, the program advances from the step S250 to a step S251C.

The step S251A controls the switch 128B so that the movable contact of the switch 128B will connect with the fixed contact "c1". The step S251B controls the switch 128B so that the movable contact of the switch 128B will connect with the fixed contact "c2". The step S251C controls the switch 128B so that the movable contact of the switch 128B will connect with the fixed contact "c3".

A step S252 following the steps S251A, S251B, and S251C controls the CPU 117 so that information will be reproduced from second and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the expansion decoder 126C. The orthogonal transform decoder 126P in the expansion decoder 126C subjects the output signal of the CD-ROM decoder 122 to a data-expansion decoding process using inverse orthogonal transform. The orthogonal transform decoder 126P in the expansion decoder 126C outputs the resultant signal to the fixed contact "c1" of the switch 128B and also the Huffman decoder 126Q in the expansion decoder 126C. The Huffman decoder 126Q in the expansion decoder 126C subjects the output signal of the orthogonal transform decoder 126P to a Huffman decoding process. The Huffman decoder 126Q in the expansion decoder 126C outputs the resultant signal to the fixed contact "c2" of the switch 128B. The Huffman decoder 126R in the expansion decoder 126C subjects the output signal of the CD-ROM decoder 122 to a Huffman decoding process. The Huffman decoder 126R in the expansion decoder 126C outputs the resultant signal to the fixed contact "c3" of the switch 128B. When the movable contact of the switch 128B connects with the fixed contact "c1" thereof, the output signal of the orthogonal transform decoder 126P in the expansion decoder 126C travels to the output circuit 112. When the movable contact of the switch 128B connects with the fixed contact "c2" thereof, the output signal of the Huffman decoder 126Q in the expansion decoder 126C travels to the output circuit 112. When the movable contact of the switch 128B connects with the fixed contact "c3" thereof, the output signal of the Huffman decoder 126R in the expansion decoder 126C travels to the output circuit 112. After the step S252, the current execution cycle of the program segment ends.

The step S217 decides whether or not the first-track information has CD-ROM code words. When the first-track information has CD-ROM code words, the program advances from the step S217 to a step S224. In this case, it is decided that the optical disc 101 agrees with a CD-ROM. When the first-track information does not have any CD-ROM code words, the program advances from the step S217 to the step S226.

The step S224 controls the switch 128B so that the movable contact of the switch 128B will connect with the fixed contact "d" thereof. In this case, the CD-ROM decoder 122 is connected to the output circuit 112 while the expansion decoder 126C is disconnected from the output circuit 112.

A step S225 following the step S224 controls the CPU 117 so that information will be reproduced from the first and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the output circuit 112. After the step S225, the current execution cycle of the program segment ends.

The step S226 controls the CPU 117 so that the CPU 117 will output a given display signal to the display unit 116. The given display signal is indicated by the display unit 116. The given display signal represents that information can not be normally reproduced from the optical disc 101. In other words, the given display signal represents a failure of the reproduction of information from the optical disc 101. After the step S226, the current execution cycle of the program segment ends.

It should be noted that the CD-ROM encoder 121 and the CD-ROM decoder 122 may be replaced by a DVD encoder (a DVD packing encoder) and a DVD decoder (a DVD unpacking decoder), respectively. In this case, the step S217 in FIG. 26 is modified to refer to MPEG code words rather than CD-ROM code words.

Twelfth Embodiment

Figure 27:
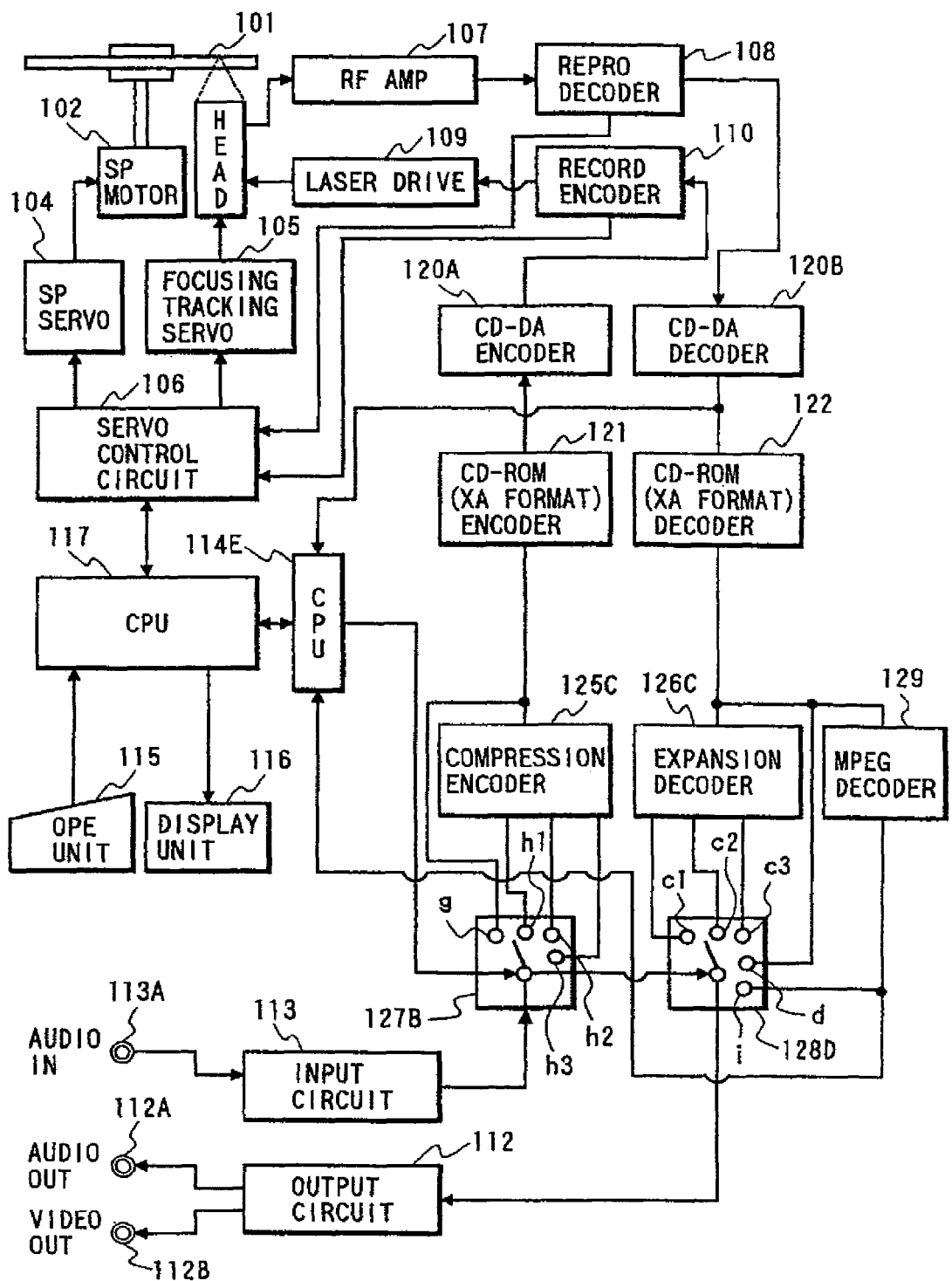
FIG. 27 is a block diagram of an apparatus for an optical disc according to a twelfth embodiment of this invention.

FIG. 27 shows a twelfth embodiment of this invention which is similar to the embodiment of FIG. 23 except for the following design changes. The embodiment of FIG. 27 includes a CPU 114E instead of the CPU 114D in FIG. 23. The embodiment of FIG. 27 includes a switch 128D instead of the switch 128B in FIG. 23. The embodiment of FIG. 27 includes an MPEG decoder 129. The embodiment of FIG. 27 is able to handle an optical disc 101 which can be selected from among various discs such as a CD-ROM-audio and a video-CD.

The switch 128D has a movable contact and fixed contacts "c1", "c2", "c3", "d", and "i". The switch 128D has a control terminal. The switch 128D is changeable among six different states in response to a signal fed to the control terminal. When the switch 128D assumes a first state, the movable contact thereof connects with only the fixed contact "c1" thereof. When the switch 128D assumes a second state, the movable contact thereof connects with only the fixed contact "c2" thereof. When the switch 128D assumes a third state, the movable contact thereof connects with only the fixed contact "c3" thereof. When the switch 128D assumes a fourth state, the movable contact thereof connects with only the fixed contact "d" thereof. When the switch 128D assumes a fifth state, the movable contact thereof connects with only the fixed contact "i" thereof. When the switch 128B assumes a sixth states, the movable contact thereof connects with none of the fixed contacts "c1", "c2", "c3", "d", and "i" thereof. The control terminal of the switch 128D is connected to the CPU 114E. The fixed contact "c1" of the switch 128D leads from the first output side of the expansion decoder 126C. The fixed contact "c2" of the switch 128D leads from the second output side of the expansion decoder 126C. The fixed contact "c3" of the switch 128D leads from the third output side of the expansion decoder 126C. The fixed contact "d" of the switch 128D leads from the output side of the CD-ROM decoder 122. The fixed contact "i" of the switch 128D leads from the output side of the MPEG decoder 129. The movable contact of the switch 128D leads to the input side of the output circuit 112. The input side of the MPEG decoder 129 is connected to the output side of the CD-ROM decoder 122. The output side of the MPEG decoder 129 is connected to the CPU 114E.

FIG. 28 is a flowchart of a segment of a program in the CPU 114E. The program segment in FIG. 28 is similar to the program segment in FIG. 26 except for the following design changes. With reference to FIG. 28, a step S217A which replaces the step S217 in FIG. 26 decides whether or not the first-track information has video-CD code words. When the first-track information has video-CD code words, the program advances from the step S217A to a step S220A. In this case, it is decided that the optical disc 101 agrees with a video-CD. When the first-track information does not have any video-CD code words, the program advances from the step S217A to the step S226.

The step S220A controls the CPU 117 so that information will be read out from a second track on the optical disc 101. In this case, the CD-DA decoder 120B outputs reproduced data to the CD-ROM decoder 122 which corresponds to the second-track information. The CD-ROM decoder 122 subjects the reproduced data to the CD-ROM decoding process including the de-interleaving process. The CD-ROM decoder 122 outputs the process-resultant data to the MPEG decoder 129. The MPEG decoder 129 subjects the output signal of the CD-ROM decoder 122 to an MPEG decoding process. The MPEG decoder 129 outputs the decoding-resultant data to the CPU 114E which corresponds to the second-track information. The step S220A receives the decoding-resultant data from the MPEG decoder 129 which corresponds to the second-track information.

A step S222A subsequent to the step S220A decides whether or not the decoding-resultant data corresponding to the second-track information is normal. When the decoding-resultant data is normal, the program advances from the step S222A to a step S224A. Otherwise, the program advances from the step S222A to the step S226.

The step S224A controls the switch 128D so that the movable contact of the switch 128D will connect with the fixed contact "i" thereof. In this case, the MPEG decoder 129 is connected to the output circuit 112.

A step S225A following the step S224 controls the CPU 117 so that information will be reproduced from second and later tracks on the optical disc 101. In this case, the CD-DA decoder 120B outputs reproduced data to the CD-ROM decoder 122. The CD-ROM decoder 122 subjects the reproduced data to the CD-ROM decoding process including the de-interleaving process. The CD-ROM decoder 122 outputs the process-resultant data to the MPEG decoder 129. The MPEG decoder 129 subjects the output signal of the CD-ROM decoder 122 to the MPEG decoding process. The MPEG decoder 129 outputs the decoding-resultant data to the output circuit 112. After the step S225A, the current execution cycle of the program segment ends.

It should be noted that the CD-ROM encoder 121 and the CD-ROM decoder 122 may be replaced by a DVD encoder (a DVD packing encoder) and a DVD decoder (a DVD unpacking decoder), respectively. In this case, the step S217A in FIG. 28 is modified to refer to MPEG code words rather than video-CD code words.

What is claimed is:

1. A signal reproducing apparatus comprising:
    means for reproducing an encoding-resultant signal of a predetermined recording-medium format from a digital disc including a DVD, the encoding-resultant signal containing audio information resulting from quantization of an audio signal including a multi-channel audio signal including a 6-channel audio signal at a quantization degree higher than a degree of quantization for a CD and at a quantization sampling frequency higher than that for a CD, the quantization sampling frequency including 96 kHz;
    means for decoding the reproduced encoding-resultant signal into a formatting-resultant signal corresponding to a predetermined format for a digital disc including a DVD, the formatting-resultant signal including segments corresponding to user data areas prescribed in the predetermined format, a compression-resultant signal being placed in the segments of the formatting-resultant signal;
    means for deformatting the formatting-resultant signal into the compression-resultant signal;
    means for expanding the compression-resultant signal into a quantization-resultant signal by a Huffman decoding process; and
    means for converting the quantization-resultant signal into the audio signal including the multi-channel audio signal.

2. A signal reproducing apparatus comprising:
    means for reproducing an encoding-resultant signal of a predetermined recording-medium format from a digital disc including a DVD, the encoding-resultant signal containing audio information resulting from quantization of an audio signal including a multi-channel audio signal including a 6-channel audio signal at a quantization degree higher than a degree of quantization for a CD and at a quantization sampling frequency higher than that for a CD, the quantization sampling frequency including 96 kHz;
    means for decoding the reproduced encoding-resultant signal into a formatting-resultant signal corresponding to a predetermined format for a digital disc including a DVD, the formatting-resultant signal including segments corresponding to user data areas prescribed in the predetermined format, a compression-resultant signal being placed in the segments of the formatting-resultant signal;
    means for deformatting the formatting-resultant signal into the compression-resultant signal;
    means for expanding the compression-resultant signal into a quantization-resultant signal by one of an orthogonal decoding process and a Huffman decoding process; and
    means for converting the quantization-resultant signal into the audio signal including the multi-channel audio signal.

3. A signal recording apparatus comprising;
    means for quantizing an input audio signal including a multi-channel audio signal including a 6-channel audio signal into a quantization-resultant signal at a quantization degree higher than a degree of quantization for a CD and at a quantization sampling frequency higher than that for a CD, the quantization sampling frequency including 96 kHz;
    means for compressing the quantization-resultant signal into a compression-resultant signal by a Huffman encoding process;
    means for formatting the compression-resultant signal into a formatting-resultant signal corresponding to a predetermined format for a digital disc including a DVD, the formatting-resultant signal including segments corresponding to user data areas prescribed in the predetermined format, the compression-resultant signal being placed in the segments of the formatting-resultant signal;
    means for encoding the formatting-resultant signal into an encoding-resultant signal of a predetermined recording-medium; and
    means for recording the encoding-resultant signal on a digital disc including a DVD.

4. A signal recording apparatus as claimed in claim 3, wherein the compressing means comprises:
    means for dividing the quantization-resultant signal into components corresponding to divided frequency bands respectively, and
    means for compressing the components according to frequency-band-dependent compression characteristics depending on a predetermined auditory sensation model.

* * * * *